United States Patent
Iwami

(10) Patent No.: US 10,437,399 B2
(45) Date of Patent: Oct. 8, 2019

(54) CONDUCTIVE FILM, DISPLAY DEVICE HAVING THE SAME, AND METHOD OF EVALUATING CONDUCTIVE FILM

(71) Applicant: FUJIFILM Corporation, Tokyo (JP)

(72) Inventor: Kazuchika Iwami, Ashigara-kami-gun (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 94 days.

(21) Appl. No.: 15/716,825

(22) Filed: Sep. 27, 2017

(65) Prior Publication Data

US 2018/0018047 A1 Jan. 18, 2018

Related U.S. Application Data

(63) Continuation of application No. PCT/JP2016/059886, filed on Mar. 28, 2016.

(30) Foreign Application Priority Data

Mar. 31, 2015 (JP) .................................. 2015-074609

(51) Int. Cl.
*G06F 3/044* (2006.01)
*G06F 3/041* (2006.01)
(Continued)

(52) U.S. Cl.
CPC ................ *G06F 3/044* (2013.01); *B32B 7/12* (2013.01); *G06F 3/041* (2013.01); *G06F 3/047* (2013.01);
(Continued)

(58) Field of Classification Search
CPC ........... G06F 3/044; G06F 2203/04112; G06F 2203/04103; G06F 3/0412; G06F 3/041
See application file for complete search history.

(56) References Cited

U.S. PATENT DOCUMENTS

| 2011/0102370 A1* | 5/2011 | Kono | G06F 3/044 345/174 |
| 2013/0063371 A1* | 3/2013 | Lee | G06F 3/044 345/173 |

(Continued)

FOREIGN PATENT DOCUMENTS

| JP | 2009-117683 A | 5/2009 |
| JP | 2012-533877 A | 12/2012 |

(Continued)

OTHER PUBLICATIONS

Communication dated Jun. 27, 2018 from the European Patent Office in counterpart Application No. 16772731.2.
(Continued)

*Primary Examiner* — Koosha Sharifi-Tafreshi
(74) *Attorney, Agent, or Firm* — Sughrue Mion, PLLC

(57) ABSTRACT

A conductive film includes a wiring pattern having the following characteristics. For each spectrum in which spectrum peaks obtained by performing two-dimensional Fourier transform on transmittance image data of the entire image has normalized spectrum intensities equal to or greater than a specified value, an angle is set to oscillate by each unit of a specific angle. Intensity differences, each of which is obtained from a maximum value and a minimum value of the normalized spectrum intensity for each angle, are calculated. One or more clusters of bars, which indicate frequencies of a histogram at an average value or more of the intensity difference in a case where the histogram is a histogram of the intensity differences, are isolated from the other cluster. In addition, in a case where a second sample standard deviation indicating a variation of first sample standard deviations, each of which indicates a variation of the normalized spectrum intensities at a single angle, in all angular directions is calculated as a quantitative value of the (Continued)

wiring pattern, the quantitative value is in a specific numerical value range.

5 Claims, 12 Drawing Sheets

(51) Int. Cl.
*B32B 7/12* (2006.01)
*G06F 3/047* (2006.01)

(52) U.S. Cl.
CPC .. *G06F 3/0412* (2013.01); *G06F 2203/04112* (2013.01)

(56) References Cited

U.S. PATENT DOCUMENTS

| | | | |
|---|---|---|---|
| 2013/0248239 A1 | 9/2013 | Lee et al. | |
| 2014/0055380 A1* | 2/2014 | Han | G06F 3/041 345/173 |
| 2015/0015979 A1 | 1/2015 | Iwami et al. | |
| 2015/0015980 A1 | 1/2015 | Iwami | |
| 2015/0286323 A1 | 10/2015 | Iwami et al. | |
| 2015/0342034 A1 | 11/2015 | Iwami | |

FOREIGN PATENT DOCUMENTS

| | | |
|---|---|---|
| JP | 2013-213858 A | 10/2013 |
| JP | 2016/059886 A1 | 6/2016 |
| WO | 2013/146056 A1 | 10/2013 |
| WO | 2014/097921 A1 | 6/2014 |
| WO | 2014/123009 A1 | 8/2014 |
| WO | 2015/030090 A1 | 3/2015 |

OTHER PUBLICATIONS

International Search Report of PCT/JP2016/059886 dated Jun. 7, 2016.

International Preliminary Report on Patentability with translation of Written Opinion dated Oct. 3, 2017, issued by the International Searching Authority in application No. PCT/JP2016/059886.

* cited by examiner

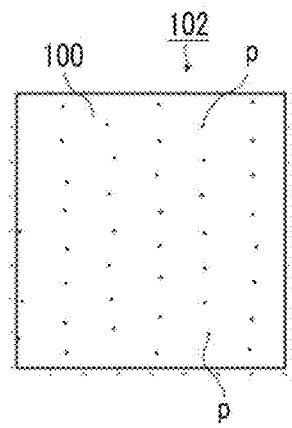
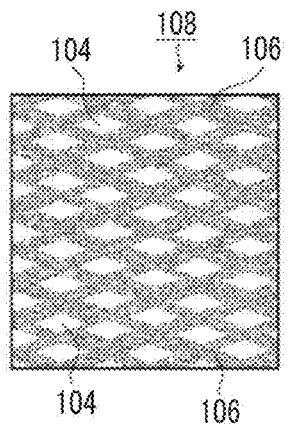
FIG. 3A  FIG. 3B
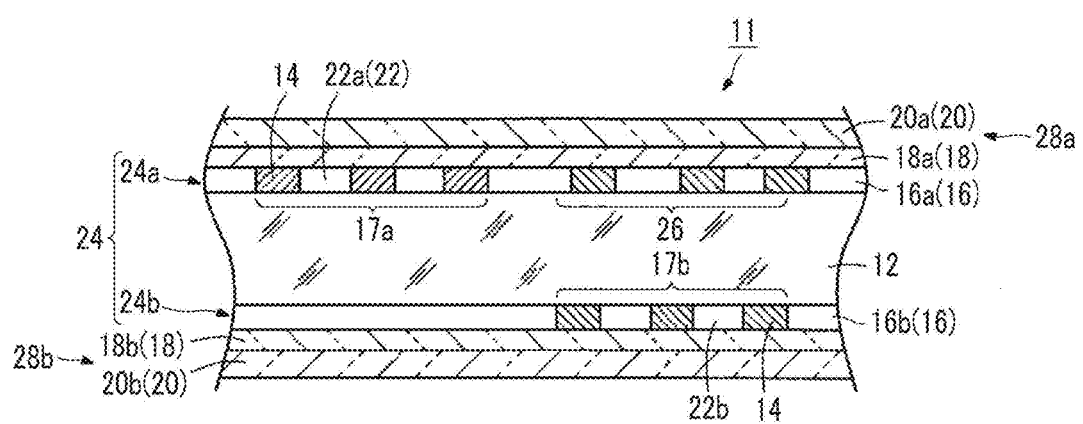
FIG. 4

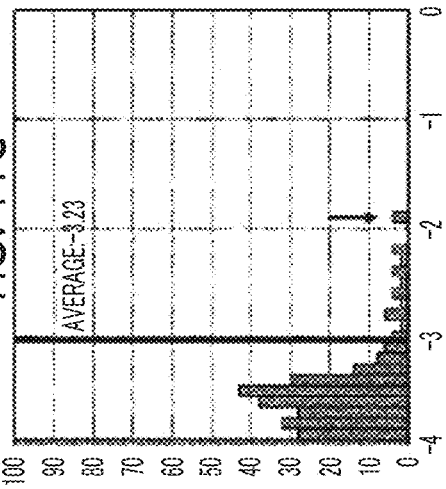
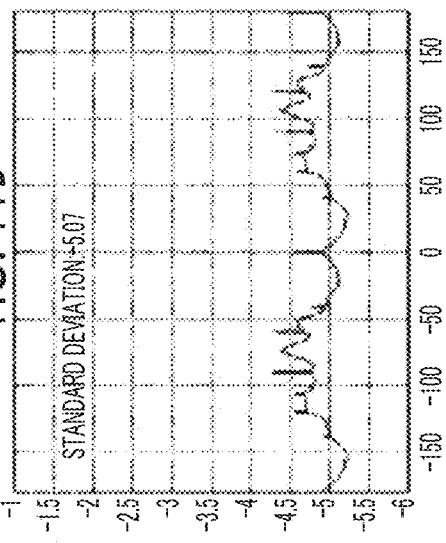
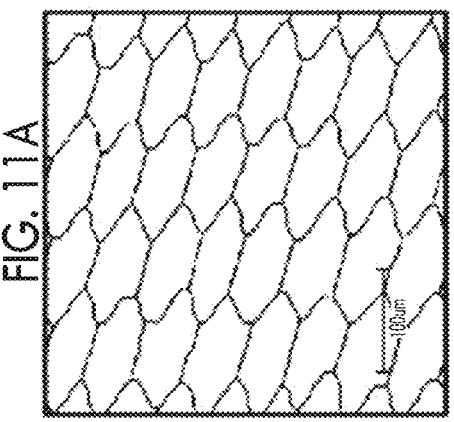
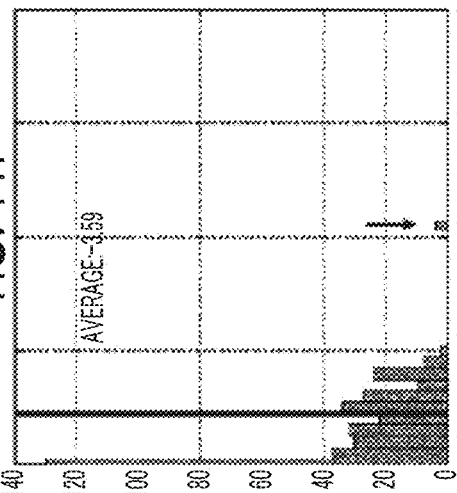
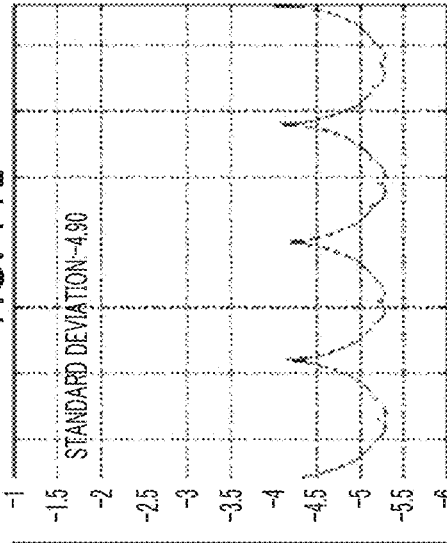
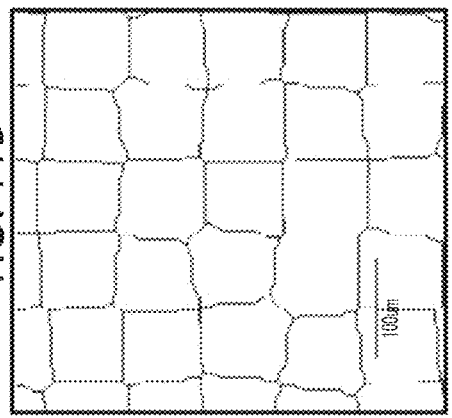

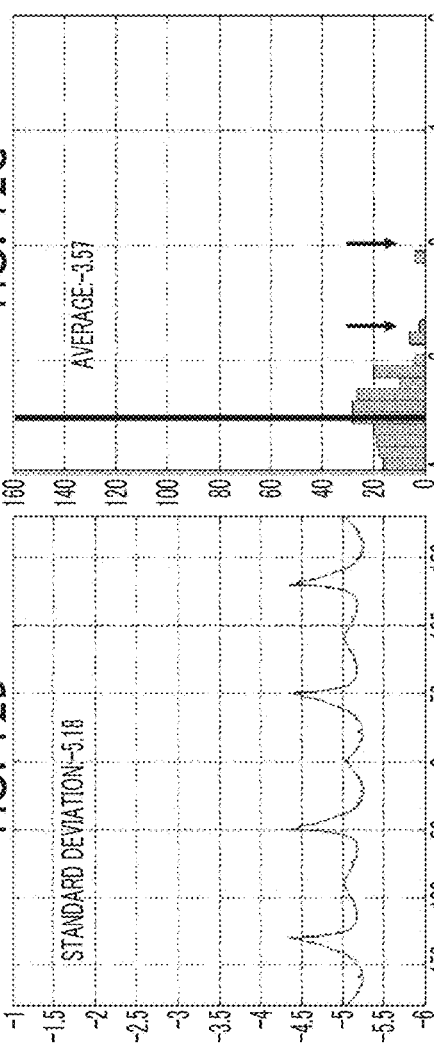
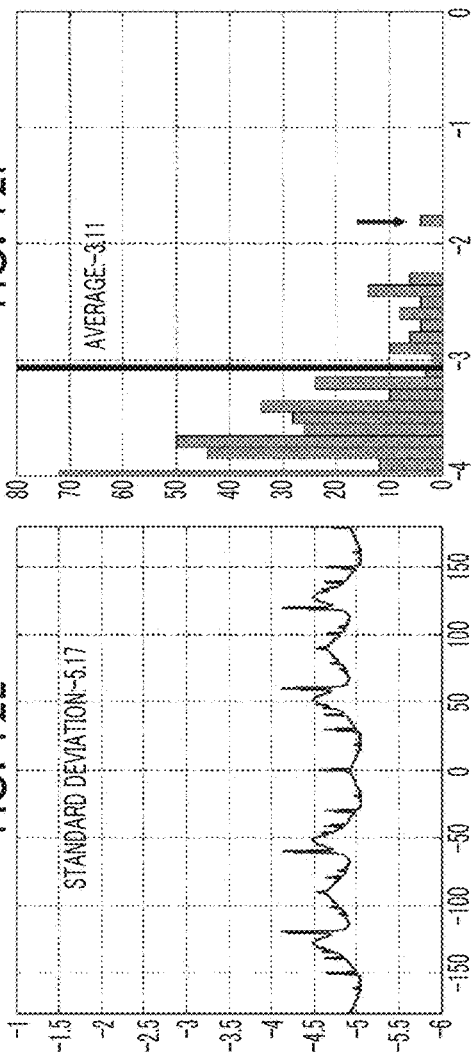

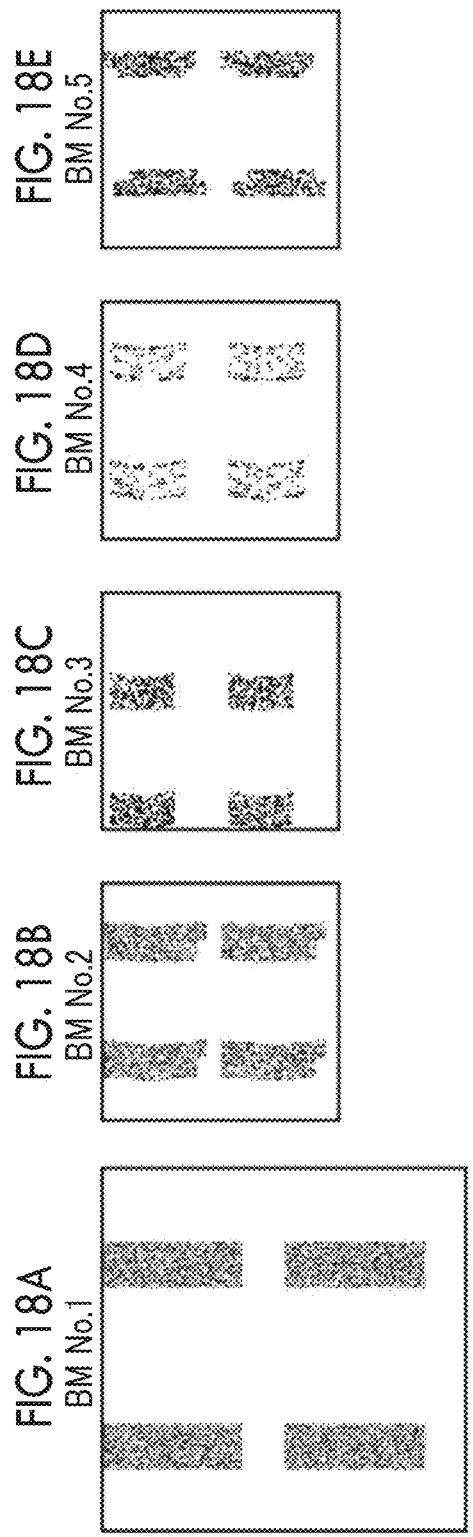

FIG. 19
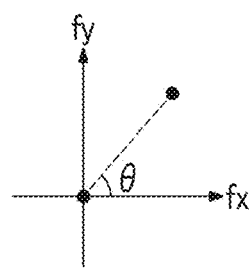
FIG. 20A                FIG. 20B
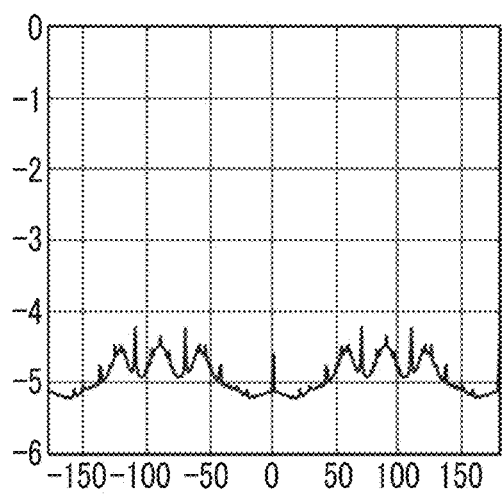 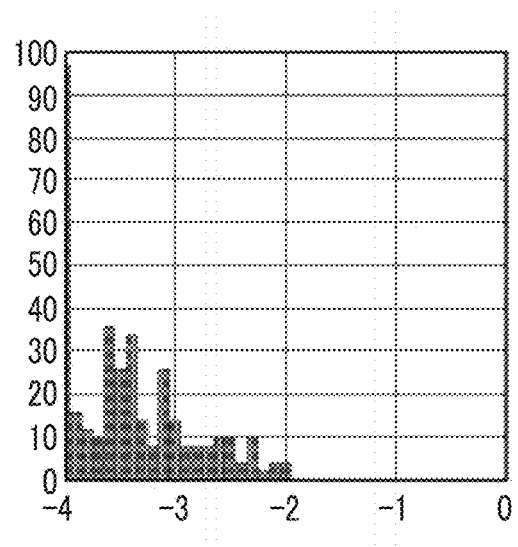

US 10,437,399 B2

CONDUCTIVE FILM, DISPLAY DEVICE HAVING THE SAME, AND METHOD OF EVALUATING CONDUCTIVE FILM

CROSS-REFERENCE TO RELATED APPLICATIONS

This application is a Continuation of PCT International Application No. PCT/JP2016/059886 filed on Mar. 28, 2016, which claims priority under 35 U.S.C. § 119(a) to Japanese Patent Application No. 2015-074609 filed on Mar. 31, 2015. The above application is hereby expressly incorporated by reference, in its entirety, into the present application.

BACKGROUND OF THE INVENTION

1. Field of the Invention

The present invention relates to a conductive film, a display device having the same, and a method of evaluating the conductive film.

2. Description of the Related Art

Examples of conductive films, each of which is provided on a display unit of a display device (hereinafter referred to as a display), include a conductive film for a touch panel.

In such a conductive film, as shown in FIG. 23A, there is a demand for a technique relating to how to arrange peaks of the mesh pattern of the conductive film with respect to frequency peaks 120 of a black matrix (BM) of a display disposed in a square lattice shape in order to obtain a mesh pattern excellent in terms of visibility with respect to moiré. Moiré for the mesh pattern excellent in terms of visibility is defined to have a high frequency and a low intensity. Thus, there is a problem that it is necessary for a plurality of frequency peaks 120 of the black matrix of the display and a plurality of frequency peaks of the mesh pattern to be disposed such that distances between peaks are maximized. In order to solve the problem, various proposals have been provided (for example, refer to US Patent App. No. 2013/0248239A1 (Corresponding JP2012-533887A) and JP2013-213858A).

US Patent App. No. 2013/0248239A1 (Corresponding JP2012-533887A) discloses, as a conductive film, a conductor having a transparent substrate and an electrically conductive pattern. In the electrically conductive pattern, in 30% or more of the entire area of the transparent substrate, in a case where a straight line intersecting with the electrically conductive pattern is drawn, a ratio (distance distribution ratio) of a standard deviation to an average value of distances between adjacent intersection points between the straight line and the electrically conductive pattern is equal to or greater than 2%. The electrically conductive pattern is a pattern with a borderline shape of figures forming a Voronoi diagram.

In such a manner, in US Patent App. No. 2013/0248239A1 (Corresponding JP2012-533887A), it is possible not only to achieve excellent conductivity while not blocking eyesight but also to prevent a moiré phenomenon from occurring.

In contrast, JP2013-213858A relating to the application of the present applicants discloses a conductive film that has a transparent substrate and a conductive section having a mesh-shaped wiring pattern. The wiring pattern has the following characteristic. A sum of an intensity of moiré within a predetermined frequency range, in which a frequency of the moiré is determined depending on visual response characteristics, is equal to or less than a predetermined value, with respect to the frequency and the intensity of the moiré obtained by applying human visual response characteristics to frequency information and intensity information of the moiré. The frequency information and the intensity information are respectively calculated from peak frequencies and peak intensities of a two-dimensional Fourier spectrum of transmittance image data of the wiring pattern and peak frequencies and peak intensities of a two-dimensional Fourier spectrum of transmittance image data of the pixel array pattern.

In such a manner, in JP2013-213858A, it is possible to prevent moirés from occurring, and it is possible to greatly improve visibility.

SUMMARY OF THE INVENTION

However, in US Patent App. No. 2013/0248239A1 (Corresponding JP2012-533887A), in maximizing distances between peaks as a problem of the conductive film, a random mesh pattern formed of Voronoi polygons as an electrically conductive pattern is used. Thus, it is possible to provide a robust random mesh pattern. However, in the conductor disclosed in US Patent App. No. 2013/0248239A1 (Corresponding JP2012-533887A), as shown in FIG. 23B, a frequency peak 122 of the Voronoi random mesh pattern has a weak peak intensity, is isotropic so as to have weak directivity, and spreads to be two-dimensionally isotropic about the frequency peak 120 of the BM. Thus, there is a problem in that it is difficult to perform control. It is not necessary to design a mesh pattern corresponding to the black matrix of the display, but there is a problem in that it is difficult to greatly improve image quality.

Further, in JP2013-213858A, in maximizing the distances between the peaks as the problem, a random pattern, in which anisotropy is one-dimensionally controlled, is used as a mesh pattern. Therefore, it is possible to provide a mesh pattern excellent in terms of visibility. However, in the conductive film disclosed in JP2013-213858A, as shown in FIG. 23C, frequency peaks 124 of the mesh pattern are separated from the frequency peak 120 of the BM at a maximum distance. However, since peak intensities thereof are strong and directivity thereof is strong, pitches of the mesh pattern are randomly set. Therefore, noise, which causes blurring in dotted line directions 126 passing through the frequency peaks 124 of the mesh pattern is limited to one-dimensional direction. As a result, there is a problem in that, in some cases, visibility with respect to noise may deteriorate.

The present invention has an object to solve the problems of the related arts and provide a conductive film, a display device having the same, and a method of evaluating the conductive film. The conductive film has a wiring pattern capable of robustly improving image quality of a transmissive image occurring in a case where a metal mesh transparent conductive film is mounted on the display while not causing moiré and being excellent in terms of visibility regardless of a display resolution and a display pixel structure such as a color filter structure.

In the present invention, the metal mesh transparent conductive film is mounted on the display. In this case, the term of being good or excellent in terms of "visibility" with respect to moiré or visibility of moiré means that moiré caused by the wiring pattern of the conductive film superposed on the display is not visibly perceived or rarely visibly perceived. In addition, the term of being good or excellent in terms of "visibility" with respect to noise or visibility of noise means that noise caused by the wiring pattern of the conductive film superposed on the display, for example, the wiring itself or the wiring pattern is not visibly perceived or rarely visibly perceived. That is, the "visibility" is defined by a degree at which moiré and/or noise is not visually perceived, that is, not perceived by human visual sensation.

In order to achieve the above-mentioned object, according to a first aspect of the present invention, a conductive film is provided on a display unit of a display device. The conductive film comprises: a transparent substrate; and a conductive section that is formed on at least one surface of the transparent substrate and is formed of a plurality of thin metal lines. The conductive section has a wiring pattern which is formed in a mesh shape by the plurality of thin metal lines and in which a plurality of opening portions is arranged. In addition, regarding the wiring pattern, normalized spectrum intensities of spectrum peaks of an entire image of the wiring pattern, which is obtained by performing a two-dimensional Fourier transform on transmittance image data of the entire image, are calculated, the spectra, which have the normalized spectrum intensities equal to or greater than a specified value, are extracted, angles, each of which is formed between one coordinate axis of two-dimensional Fourier coordinates and a straight line connecting coordinates of each extracted spectrum and an origin of the two-dimensional Fourier coordinates, are calculated in units of a specific angle for each extracted spectrum, intensity differences, each of which is obtained from a maximum value and a minimum value of the normalized spectrum intensity for each angle, are calculated, at all points of the extracted spectrum by oscillating the angle by each unit of the specific angle, with respect to the extracted spectrum, one or more clusters of bars, which indicate frequencies of a histogram at an average value or more of the intensity difference in a case where the histogram is a histogram of the intensity differences at all the points, are isolated from the other cluster, and in a case where a second sample standard deviation indicating, a variation of first sample standard deviations, each of which indicates a variation of the normalized spectrum intensities at a single angle, in all angular directions is calculated as a quantitative value of the wiring pattern, the quantitative value is in a specific numerical value range.

In order to achieve the above-mentioned object, a display device according to a second aspect of the present invention comprises: a display unit; and the conductive film according to the first aspect, the conductive film being provided on the display unit.

Further, in order to achieve the above-mentioned object, according to a third aspect of the present invention, there is provided a method of evaluating a conductive film that is provided on a display unit of a display device and has a wiring pattern which is formed in a mesh shape by the plurality of thin metal lines and in which a plurality of opening portions is arranged. The method comprises: acquiring transmittance image data of the wiring pattern of an entire image of the conductive film; calculating normalized spectrum intensities of spectrum peaks of the entire image which is obtained by performing two-dimensional Fourier transform on transmittance image data of the entire image; extracting the spectra which have the normalized spectrum intensities equal to or greater than a specified value; calculating an angle, which is formed between one coordinate axis of two-dimensional Fourier coordinates and a straight line connecting coordinates of each extracted spectrum and an origin of the two-dimensional Fourier coordinates, in units of a specific angle for each extracted spectrum; calculating intensity differences, each of which is obtained from a maximum value and a minimum value of the normalized spectrum intensity for each angle, at all points of the extracted spectrum by oscillating the angle by each unit of the specific angle, with respect to the extracted spectrum, and calculating a second sample standard deviation indicating a variation of first sample standard deviations, each of which indicates a variation of the normalized spectrum intensities at a single angle, in all angular directions, as a quantitative value of the wiring pattern; and evaluating the wiring pattern where one or more clusters of bars, which indicate frequencies of a histogram at an average value or more of the intensity difference in a case where the histogram is a histogram of the calculated intensity differences at all the points, are isolated from the other cluster and the quantitative value is in a specific numerical value range.

In the first aspect, the second aspect, and the third aspect, it is preferable that each normalized spectrum intensity is a standard value which is normalized by an image size and an average value of a spectrum intensity of each spectrum of the entire image, the specified value is $-4.0$ as a value which is 10,000 times a logarithmic value of a value of the normalized spectrum intensity, the unit of the specific angle is 1 degree, each intensity difference is 10,000 times a logarithmic value of a value of a difference between a maximum value and a minimum value of the normalized spectrum intensity at one angle, a range of the intensity difference forming a horizontal axis of the histogram is from $-4.0$ to 0, and a step width of the range is 0.1, and the specific numerical value range is from $-5.29$ to $-5.05$.

It is preferable that the angle is obtained by calculating a value of the angle up to two decimal places and rounding off the value with two decimal places to one decimal place.

It is preferable that the wiring pattern is formed by generating a plurality of dots regularly arranged on a rectangular plane, moving the arranged dots in arbitrary directions of 360 degrees using random numbers so as to give randomicity, generating polygons centering on the randomly arranged dots, and thinning a region between the polygons.

It is preferable that the wiring pattern is superposed on a pixel array pattern of the display unit. It is preferable that the pixel array pattern is the black matrix pattern.

As described above, according to the present invention, it is possible to robustly improve image quality of a transmissive image occurring in a case where a transparent conductive film having a metal mesh wiring pattern is mounted on the display, regardless of a display resolution and a display pixel structure such as a color filter structure.

Further, according to the present invention, as a characteristic of the wiring pattern of the conductive film, there is anisotropy in frequency space. Thus, it is possible to provide a random pattern with directivity. By using such a random pattern with directivity, it is possible to provide a mesh pattern which is robust to a display resolution and a display pixel structure.

Further, according to the present invention, it is possible to robustly improve image quality with respect to a different display resolution and a different display pixel (color filter) structure.

According to the present invention, as compared with the regular pattern disclosed in JP2013-213858A, it is possible to design image quality which is robust to the display resolution and the pixel (particularly, sub-pixel such as color filter) structure. In contrast, as compared with the Voronoi random pattern, it is possible to give freedom to design to some extent. Therefore, it is possible to suppress deterioration in image quality caused by visibility of moiré.

BRIEF DESCRIPTION OF THE DRAWINGS

FIG. 3A is a schematic explanatory view of an example of a dot cut-out image showing seed points (dots) generated at arbitrary intervals in a single planar region in order to generate the polygons forming the random mesh pattern shown in FIG. 2, and FIG. 3B is a schematic explanatory view of an example of a rhomboid pattern image having a pattern of rhomboids at positions of dots on the dot cut-out image shown in FIG. 3A.

FIG. 4 is a schematic partial cross-sectional view of an example of a conductive film according to a second embodiment of the present invention.

FIGS. 11A and 11D are respectively plan views schematically illustrating other examples of the random mesh pattern according to the present invention. FIGS. 11B and 11E are respectively graphs illustrating examples of an angular direction variation of single angular direction variations of the FFT spectrum intensities of the random mesh patterns shown in FIGS. 11A and 11D. FIGS. 11C and 11F are respectively histograms of the difference between the maximum value and the minimum value for each angle of the FFT spectrum intensities of the random mesh patterns shown in FIGS. 11A and 11D.

FIGS. 12A and 12D are respectively plan views schematically illustrating other examples of the random mesh pattern according to the present invention. FIGS. 12B and 12E are respectively graphs illustrating examples of an angular direction variation of single angular direction variations of the FFT spectrum intensities of the random mesh patterns shown in FIGS. 12A and 12D. FIGS. 12C and 12F are respectively histograms of the difference between the maximum value and the minimum value for each angle of the FFT spectrum intensities of the random mesh patterns shown in FIGS. 12A and 12D.

FIG. 15(B) is a partially enlarged view of the pixel array patterns of FIG. 15(A).

FIGS. 18A to 18I are schematic diagrams illustrating examples of repetition units each having 2×2 pixels of representative sub-pixels of pixel array patterns of display units of which resolutions and shapes are different.

FIG. 19 is an explanatory view illustrating calculation of the angle of the FFT spectrum intensity of the random mesh pattern according to the present invention.

FIG. 20A is a graph illustrating an example of a sample standard deviation which indicates the variation of the difference between the maximum value and the minimum value of the FFT spectrum intensity of the random mesh pattern according to the present invention, for each angle. FIG. 20B is a histogram of the difference between the maximum value and the minimum value of the FFT spectrum intensity of the random mesh pattern shown in FIG. 20A, for each angle.

DESCRIPTION OF THE PREFERRED EMBODIMENTS

Figure 1:
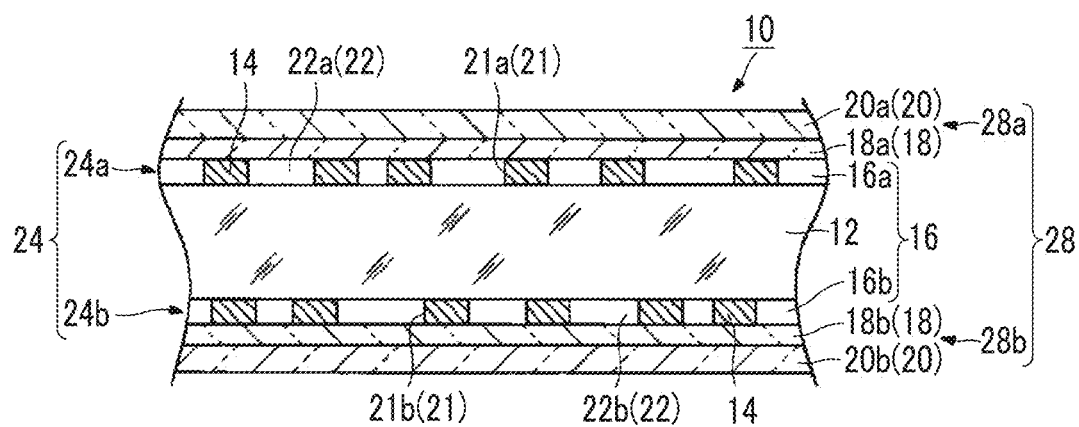
FIG. 1 is a partial cross-sectional view schematically illustrating an example of a conductive film according to a first embodiment of the present invention.

Hereinafter, a conductive film according to the present invention, a display device having the same, and a method of evaluating the conductive film will be described in detail with reference to most preferred embodiments shown in the accompanying drawings.

The conductive film of the present invention is characterized by the following point. By using a random pattern having anisotropy as a mesh-shaped wiring pattern (hereinafter simply referred to as a mesh pattern), regardless of a resolution of a black matrix (hereinafter referred to as a BM) of a display unit (hereinafter referred to a display) of a display device and a color filter structure of the display, visibility is made to be excellent without causing moiré in a display image of the display, and thus it is possible to provide robust image quality improvement.

As described above, in the present invention, there are the following problems. In a case where the mesh pattern is a regular pattern, since frequency peak intensities are strong and directivity is also excessively strong, a design for improving image quality by maximizing distances between the frequency peaks depending on a pixel structure and the resolution of the display is necessary. In addition, in a case where the mesh pattern is a Voronoi random pattern, since the frequency peak intensities are weak and the directivity is also excessively strong, those do not depend much on the pixel structure and the resolution of the display, and a design therefor is not necessary, but the distances between the frequency peaks cannot be controlled, and great improvement in image quality cannot be achieved. In order to solve the problems, a robust random mesh pattern as a random pattern, which has directivity in the middle between the directivity of the regular pattern and the directivity of the Voronoi random pattern, is provided to the pixel structure and the resolution of the display.

Accordingly, in a case of observing a histogram (fixed condition: refer to Expression (1)) of a directivity angle variation of a spectrum of fast Fourier transform (FFT) of the mesh pattern, the present inventors found out the following. The Voronoi random pattern formed of Voronoi polygons can be distinguished on the basis of a condition where there is at least one isolated island on the side of stronger intensity than the average value, that is, a condition where at least one cluster of bars indicating frequencies of the histogram is isolated from the other cluster. In addition, the regular pattern can be distinguished on the basis of a condition where a directivity angle variation is within a specific numerical value range. On the basis of the founding, in the present invention, a variation of the Fourier spectrum intensities is set to be smaller than that of the regular pattern in a manner similar to that of the Voronoi random pattern, and a directivity angle variation (second sample standard deviation), which is an omnidirectional variation of single direction variations (first sample standard deviation) in all directions from the origin, is set to be larger than that of the Voronoi random pattern in a manner similar to that of the regular pattern in Fourier space coordinates. Thereby, it is possible to improve image quality which relates to visibility of moiré and is robust to the pixel structure and the resolution of the display. As a result, it is possible to provide the conductive film of the present invention and the evaluation method thereof.

Hereinafter, the conductive film according to the present invention will be described as a representative example of a conductive film for a touch panel. The present invention is not limited to this. The conductive film may be any conductive film if it is a conductive film that is provided on the display unit with various light emission intensities of the display device and has wiring portions having random mesh-shaped wiring patterns (random mesh patterns) which are disposed on both sides of a transparent substrate or disposed on a single side thereof with an insulation layer interposed therebetween and which include at least one wiring pattern formed of random polygonal cells (opening portions). For example, as a matter of course, the present invention may be applied to a conductive film for shielding electromagnetic waves and the like.

The display unit of the display device on which the conductive film according to the present invention is superposed is not particularly limited. However, examples thereof include a liquid crystal display (LCD), a plasma display panel (PDP), organic light emitting (EL) diode (OLED) and an organic electro-luminescence display (OELD) using organic electro-luminescence (OEL), an inorganic electro-luminescence display (EL display), electronic paper, and the like.

As will be described in detail later, the display unit of the display device, on which the conductive film of the present invention is superposed, is not particularly limited if the display unit has the following characteristics. Pixels thereof, each of which includes a plurality of sub-pixels emitting light with a plurality of colors including at least mutually different three colors such as red, green, and blue, are arranged in the pixel array pattern (hereinafter also referred to as the BM pattern), and the luminances (brightnesses) of respective sub-pixels (color filters) based on the light emission intensity (luminance) of the pixels are not particularly limited if the luminances can be taken into consideration in terms of evaluation of the visibility of moiré due to the superposition of the conductive film. For example, in the same manner as that of the related arts, the display unit may have the following characteristics. The repetition cycles and the intensities (shapes, sizes), that is, the sub-pixel array pattern (the shapes, sizes, and cycles of the sub-pixels) of the sub-pixels (color filters) are all the same for a plurality of colors such as RGB, and the display unit has a BM pattern typified by G sub-pixels. Further, like the above-mentioned OELD, the display unit may be a display unit having a BM pattern that includes sub-pixel array patterns which are not the same for a plurality of colors, that is, which are different with respect to at least two colors.

In a manner similar to that of a high resolution smartphone, a tablet terminal, or the like, the display of the display device subjected to the present invention may be a display which has a high emission intensity. In a manner similar to that of a low resolution desktop PC, a television (TV), or the like, the display may be a display having a low emission intensity. In a manner similar to that of a medium resolution laptop or the like, the display may be a display having approximately a medium emission intensity.

Figure 2:
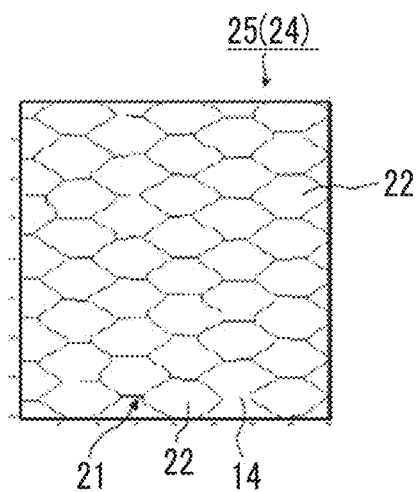
FIG. 2 is a plan view schematically illustrating an example of a random mesh-shaped wiring pattern of a wiring portion of the conductive film shown in FIG. 1.

FIG. 1 is a partial cross-sectional view schematically illustrating an example of a conductive film according to a first embodiment of the present invention. FIG. 2 is a plan view schematically illustrating an example of a wiring pattern of a wiring portion of the conductive film shown in FIG. 1.

As shown in the drawings, a conductive film 10 of the present embodiment is a conductive film that is provided on the display unit of the display device and that has a wiring pattern which is excellent in terms of suppression of occurrence of moiré in the black matrix (BM) of the display unit, particularly, a wiring pattern which is excellent in terms of visibility of moiré in the BM pattern in a case where the wiring pattern overlaps with the BM pattern. The conductive film 10 has: a transparent substrate 12; a first wiring portion 16*a* that is formed on one surface (an upper surface in FIG. 1) of the transparent substrate 12, is formed of a plurality of thin lines made of metal (hereinafter referred to as thin metal lines) 14, and functions as a first electrode portion; a first protective layer 20*a* that is bonded to substantially the entire surface of the first wiring portion 16*a* through a first adhesive layer 18*a* so as to cover the thin metal lines 14; a second wiring portion (electrode) 16b that is formed on the other surface (a lower surface in FIG. 1) of the transparent substrate 12, is formed of a plurality of thin metal lines 14, and functions as a second electrode portion; and a second protective layer 20b that is bonded to substantially the entire surface of the second wiring portion 16b through a second adhesive layer 18b.

Hereinafter, the first wiring portion 16a and the second wiring portion 16b are collectively referred to as simply wiring portions 16, the first adhesive layer 18a and the second adhesive layer 18b are collectively referred to as simply adhesive layers 18, and the first protective layer 20a and the second protective layer 20b are collectively referred to as simply protective layers 20.

The transparent substrate 12 is formed of a material having an insulation property and having a high light-permeability, and examples thereof include a resin, glass, and silicon. Examples of the resin include polyethylene terephthalate (PET), polymethyl methacrylate (PMMA), polypropylene (PP), polystyrene (PS), and the like.

The thin metal lines 14 are not particularly limited as long as they are thin lines made of metal having high conductivity, and include thin lines made of a line material such as gold (Au), silver (Ag) or copper (Cu). While it is more preferable indeed in terms of visibility if the thin metal lines 14 have a smaller line width, the line width has only to be equal to or less than 30 μm, for instance. For application to a touch panel, the line width of the thin metal lines 14 is preferably equal to or greater than 0.1 μm and equal to or less than 15 μm, more preferably equal to or greater than 1 μm and equal to or less than 9 μm, and still more preferably equal to or greater than 2 μm and equal to or less than 7 μm.

Each wiring portion 16 (16a, 16b) has a plurality of thin metal lines 14 having the wiring pattern 24 (24a, 24b) which is formed of mesh wires 21 (21a, 21b) arranged in a mesh shape. Specifically, as shown in FIG. 2, the wiring pattern 24 (24a, 24b) is a mesh pattern in which opening portions (cells) 22 (22a, 22b) are arranged in a predetermined random shape such as a random polygonal shape formed by intersecting the plurality of thin metal lines 14 with each other.

As shown in FIG. 2, each wiring portion 16 (16a and 16b) is formed of the thin metal lines 14 and a wiring layer 28 (28a and 28b) that has the wiring pattern 24 (24a and 24b) formed in a random mesh shape by the opening portions (cells) 22 (22a and 22b) between the thin metal lines 14 adjacent to each other. Each of the wiring patterns 24a and 24b is a wiring pattern in which the opening portions formed of the plurality of thin metal lines are anisotropic, that is, a random mesh pattern 25. The random mesh pattern 25 may be any random mesh pattern if the opening portions 22 formed of the thin metal lines 14 have two or more types of different opening shapes and two or more types of random polygonal shapes having different numbers of vertices.

Here, the anisotropic random mesh pattern 25 shown in FIG. 2 can be manufactured as described below.

First, as shown in FIG. 3A, a dot cut-out image 102 is generated. In the image, seed points (dots) p are arranged at a plurality of positions randomly selected at arbitrary intervals, for example, a plurality of positions at arbitrary intervals using a random number or the like, centroids of closed sections such as rhomboids in a single planar region 100. It should be noted that dots are regularly arranged in the planar region 100 in advance, and the intervals between the dots are shifted in arbitrary directions of 360 degrees by using a standard deviation or the like, whereby the seed points p may be arranged.

Next, as shown in FIG. 3B, rhomboid patterns 104 are formed as the opening portions 22 arranged around the positions of the seed points p shown in FIG. 3A in the planar region 100 such that the adjacent rhomboid patterns 104 are spaced apart from each other and a boundary region 106 is interposed therebetween, thereby forming a rhomboid pattern image 108. In the example shown in the drawing, the rhomboid patterns 104 are formed around the seed points p, but the present invention is not limited to the rhomboids. The shape of each pattern may be a polygon including a triangle such as an equilateral triangle or an isosceles triangle, a quadrangle such as a square, a rectangle, or a parallelogram, a pentagon such as a regular pentagon, a hexagon such as a regular hexagon, and the like.

Next, in order to thin lines of the boundary region 106 of the rhomboid pattern image 108 shown in FIG. 3B, thinning processing, for example, thinning processing of Matlab produced by Mathworks Corp. is performed.

Here, the thinning processing is performed as follows. The boundary region 106 is reduced in size by removing pixels of the edge portions of the boundary region 106, and the rhomboid patterns 104 are expanded by removing pixels of the edge portions of the rhomboid patterns 104. These processes are repeated, thereby performing thinning such that thin lines are formed of random line segments with the same line widths.

In such a manner, the random mesh pattern 25 shown in FIG. 2 can be formed.

The thin metal lines 14 having such a shape can be easily formed by a known method such as etching using a metal layer such as silver.

In the conductive film of the present invention 10, a combined wiring pattern 24 of the upper and lower wiring patterns 24a and 24b is a random mesh pattern 25 excellent in terms of visibility of moiré regardless of the resolution and the pixel structure of the display unit. In addition, in the present invention, the random mesh pattern excellent in terms of visibility of moiré is defined as a single random pattern or a group of two or more random patterns making moiré not perceived by human visual sensation regardless of the pixel structure and the resolution of the display unit. It should be noted that, in the present invention, as described above, the visibility of moiré is defined by a degree at which moiré is not visually perceived.

Accordingly, in a case where the random mesh pattern 25 shown in FIG. 2 is formed as the combined wiring pattern 24, the pattern has the following characteristic. Normalized spectrum intensities of spectrum peaks of the entire image of the random mesh pattern 25, which is obtained by performing two-dimensional Fourier transform on transmittance image data of the entire image, are calculated, spectra, which have the normalized spectrum intensities equal to or greater than a specified value, are extracted, angles in the two-dimensional Fourier coordinates are calculated in units of a specific angle for each extracted spectrum, intensity differences, each of which is obtained from a maximum value and a minimum value of the normalized spectrum intensity for each angle, are calculated, at all points of the extracted spectrum by oscillating the angle by each unit of the specific angle, with respect to the extracted spectrum, and a sample standard deviation of the intensity differences is calculated as a quantitative value of the pattern. In this case, there are islands of peak values at an average value or more of the intensity differences in a case of using a histogram of the intensity differences at all points. As a result, the random mesh pattern is characterized in that the quantitative value is within a specific numerical value range. Even in a case where such a random mesh pattern 25 is superposed on a display screen of a certain display, it is possible to sufficiently suppress occurrence of moiré. Therefore, the pattern is excellent in terms of visibility of moiré capable of improving visibility, and is thus a random mesh pattern which is robust to the pixel structure and the resolution of the display.

It should be noted that a configuration of the random mesh pattern of the conductive film of the present invention will be described later.

In such a random mesh pattern 25, disconnections (brakes) may be inserted into sides (mesh wires 21) of the thin metal lines 14 constituting the opening portions 22. As the shape of the mesh-shaped wiring pattern having such breaks, it is possible to employ a shape of a mesh-shaped wiring pattern of a conductive film described in JP2012-276175 (filed as PCT/JP2013/083001 and published as WO2014/097921A1) relating to the present application of the applicant.

As described above, the first protective layer 20a is bonded to the substantially entire surface of the wiring layer 28a formed of the first wiring portion 16a through the first adhesive layer 18a so as to cover the thin metal lines 14 of the first wiring portion 16a. Further, the second protective layer 20b is bonded to the substantially entire surface of the wiring layer 28b formed of the second wiring portion 16b through the second adhesive layer 18b so as to cover the thin metal lines 14 of the second wiring portion 16b.

Here, examples of materials of the adhesive layers 18 (the first adhesive layer 18a and the second adhesive layer 18b) include a wet lamination adhesive, a dry lamination adhesive, a hot melt adhesive, and the like. The material of the first adhesive layer 18a and the material of the second adhesive layer 18b may be the same or may be different.

The protective layers 20 (the first protective layer 20a and the second protective layer 20b) each are made of a high transmissive material including resin, glass, and silicon, similarly to the transparent substrate 12. The material of the first protective layer 20a and the material of the second protective layer 20b may be the same or may be different.

It is preferable that both a refractive index n1 of the first protective layer 20a and a refractive index n2 of the second protective layer 20b are values equal or approximate to a refractive index n0 of the transparent substrate 12. In this case, both the relative refractive index nr1 of the transparent substrate 12 with respect to the first protective layer 20a and the relative refractive index nr2 of the transparent substrate 12 with respect to the second protective layer 20b are values approximate to 1.

In this specification, the refractive index means a refractive index for the light at a wavelength of 589.3 nm (sodium D ray). For example, in regard to resins, the refractive index is defined by ISO 14782: 1999 (corresponding to JIS K 7105) that is an international standard. Further, the relative refractive index nr1 of the transparent substrate 12 with respect to the first protective layer 20a is defined as nr1= (n1/n0), and the relative refractive index nr2 of the transparent substrate 12 with respect to the second protective layer 20b is defined as nr2=(n2/n0).

Here, the relative refractive index nr1 and the relative refractive index nr2 are preferably in a range equal to or greater than 0.86 and equal to or less than 1.15, and more preferably in a range equal to or greater than 0.91 and equal to or less than 1.08.

By limiting the ranges of the relative refractive index nr1 and the relative refractive index nr2 as the above-mentioned range and controlling a member-to-member light transmittance between the transparent substrate 12 and the protective layers 20 (20a, 20b), visibility of moiré can be further improved, and thus the conductive film can be improved.

In the conductive film 10 of the embodiment shown in FIG. 1, the wiring portions 16 (16a and 16b) on both the upper and lower sides of the transparent substrate 12 each are formed as an electrode portion having the plurality of thin metal lines 14. However, the present invention is not limited to this, and at least one of the first or second wiring portion 16a or 16b may be formed of an electrode portion and a non-electrode portion (dummy electrode portion).

FIG. 4 is a schematic partial cross-sectional view of an example of a conductive film according to a second embodiment of the present invention. The plan view of the wiring patterns of the conductive film according to the second embodiment shown in FIG. 4 is the same as the plan view of the wiring pattern shown in FIG. 2, and accordingly, will be omitted herein.

As shown in the drawing, the conductive film 11 according to the second embodiment has: the first wiring portion 16a that is formed of a first electrode portion 17a and the dummy electrode portion 26 which are formed on one surface (on the upper side in FIG. 12) of the transparent substrate 4; the second wiring portion 16b that is formed of the second electrode portion 17b which is formed on the other surface (on the lower side in FIG. 12) of the transparent substrate 4; the first protective layer 20a that is bonded to the substantially entire surface of the first wiring portion 16a, which is formed of the first electrode portion 17a and the dummy electrode portion 26, through the first adhesive layer 18a; and the second protective layer 20b that is bonded to the substantially entire surface of the second wiring portion 16b, which is formed of the second electrode portion 17b, through the second adhesive layer 18b.

In the conductive film 11, the first electrode portion 17a and the dummy electrode portion 26 each are formed of the plurality of thin metal lines 14 and both thereof are formed as the wiring layer 28a on one surface (on the upper side in FIG. 4) of the transparent substrate 12, and the second electrode portion 17b is formed of the plurality of thin metal lines 14 and is formed as the wiring layer 28b on the other surface (on the lower side in FIG. 4) of the transparent substrate 12. Here, the dummy electrode portion 26 is formed on one surface (on the upper side in FIG. 4) of the transparent substrate 12 similarly to the first electrode portion 17a, and has the plurality of thin metal lines 14 similarly arranged at positions corresponding to the plurality of thin metal lines 14 of the second electrode portion 17b formed on the other surface (on the lower side in FIG. 4), as shown in the drawing.

The dummy electrode portion 26 is separated from the first electrode portion 17a by a predetermined distance, and is in the state of being electrically insulated from the first electrode portion 17a.

In the conductive film 11 according to the present embodiment, the dummy electrode portion 26 formed of the plurality of thin metal lines 14 corresponding to the plurality of thin metal lines 14 of the second electrode portion 17b formed on the other surface (on the lower side in FIG. 4) of the transparent substrate 12 is formed on one surface (on the upper side in FIG. 4) of the transparent substrate 12. Therefore, scattering due to the thin metal lines on the one surface (on the upper side in FIG. 4) of the transparent substrate 12 can be controlled, and it is thus possible to improve visibility of electrode.

Here, the first electrode portion 17a and the dummy electrode portion 26 of the wiring layer 28a have the wiring pattern 24a having a mesh shape which is formed by the thin metal lines 14 and opening portions 22. The second electrode portion 17b of the wiring layer 28b has a wiring pattern 24b having a mesh shape which is formed by the thin metal lines 14 and opening portions 22, similarly to the first electrode portion 17a. As described above, the transparent substrate 12 is formed of an insulating material, and the second electrode portion 17b is in the state of being electrically insulated from the first electrode portion 17a and the dummy electrode portion 26.

In addition, the first and second electrode portions 17a and 17b and the dummy electrode portion 26 each can be formed of the same material as the wiring portions 16 of the conductive film 10 shown in FIG. 1 in the same manner.

The first protective layer 20a is bonded to the substantially entire surface of the wiring layer 28a formed of the first electrode portion 17a and the dummy electrode portion 26 through the first adhesive layer 18a so as to cover the thin metal lines 14 of the first electrode portion 17a and the dummy electrode portion 26 of the first wiring portion 16a.

Further, the second protective layer 20b is bonded to the substantially entire surface of the wiring layer 28b formed of the second electrode portion 17b through the second adhesive layer 18b so as to cover the thin metal lines 14 of the second electrode portion 17b of the second wiring portion 16b.

It should be noted that the first and second adhesive layers 18a and 18b and the first and second protective layers 20a and 20b of the conductive film 11 shown in FIG. 4 are those of the conductive film 10 shown in FIG. 1, and a description thereof will be omitted.

In the conductive film 11 of the present embodiment, the second wiring portion 16b having the second electrode portion 17b does not have the dummy electrode portion. However, the present invention is not limited to this, and in the second wiring portion 16b, the dummy electrode portion, which is electrically insulated from the second electrode portion 17b at a predetermined interval away from the second electrode portion 17b and is formed of the thin metal lines 14, may be disposed at a position corresponding to the first electrode portion 17a of the first wiring portion 16a.

In the conductive film 11 of the present embodiment, the dummy electrode portion 26 is provided on the first wiring portion 16a, and such a dummy electrode portion is provided on the second wiring portion 16b. Thereby, the dummy electrode portions may be disposed to correspond to respective mesh wires of the first electrode portion 17a of the first wiring portion 16a and the second electrode portion 17b of the second wiring portion 16b. Therefore, scattering due to the thin metal lines on the one surface (on the upper or lower side in FIG. 4) of the transparent substrate 12 can be controlled, and it is thus possible to improve visibility of electrode.

In the conductive films 10 and 11 of the first and second embodiments shown in FIGS. 1 and 4, the wiring portions 16 (16a and 16b) are respectively formed on both upper and lower sides of the transparent substrate 12. However, the present invention is not limited to this, and in a manner similar to that of a conductive film 11A of a third embodiment of the present invention shown in FIG. 5, the following structure may be adopted: the wiring portion 16 formed of the plurality of thin metal lines 14 may be formed on one surface (the upper surface in FIG. 5) of the transparent substrate 12, and two conductive film elements, in which the protective layers 20 are bonded to substantially the entire surfaces of the wiring portions 16 through the adhesive layers 18 so as to cover the thin metal lines 14, overlap with each other.

Figure 5:
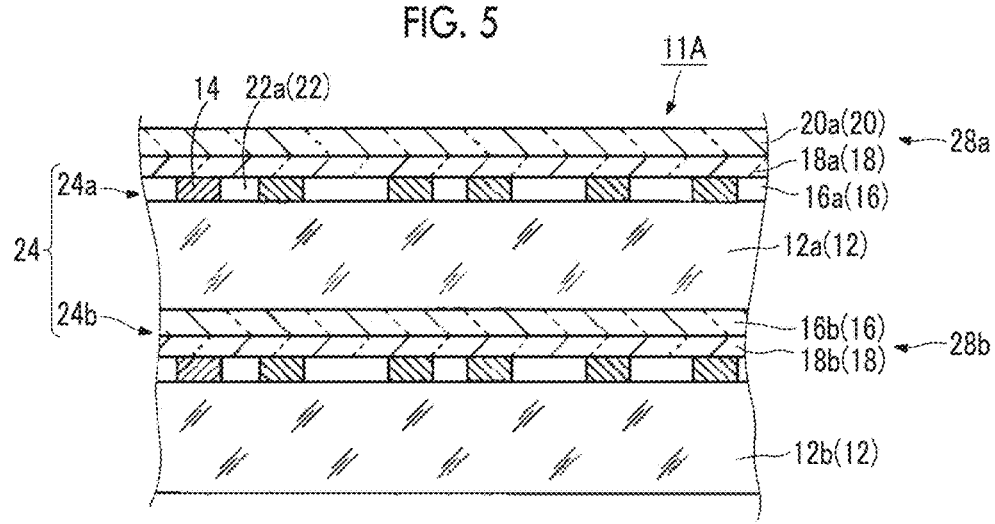
FIG. 5 is a schematic partial cross-sectional view of an example of a conductive film according to a third embodiment of the present invention.

The conductive film 11A of the third embodiment of the present invention shown in FIG. 5 has: a lower transparent substrate 12b in FIG. 5; the second wiring portion 16b that is formed of the plurality of thin metal lines 14 formed on the upper surface of the transparent substrate 12b; the second protective layer 20b that is bonded onto the second wiring portion 16b through the second adhesive layer 18b; an upper transparent substrate 12a that is bonded onto and disposed on the second protective layer 20b through for example an adhesive or the like; the first wiring portion 16a that is formed of the plurality of thin metal lines 14 formed on the upper surface of the transparent substrate 12a; and the protective layer 20a that is bonded onto the first wiring portion 16a through the adhesive layer 18a.

Here, the entirety or a part of at least one of the thin metal lines 14 of the first wiring portion 16a and/or second wiring portion 16b is the random mesh pattern 25 shown in FIG. 2.

Figure 6:
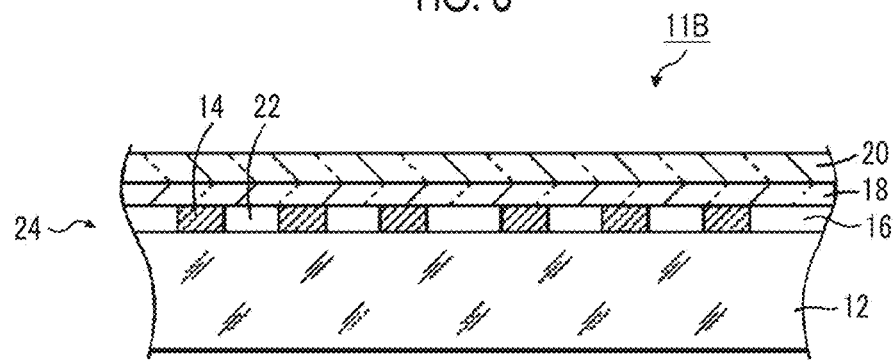
FIG. 6 is a schematic partial cross-sectional view of an example of a conductive film according to a fourth embodiment of the present invention.

In the conductive films 10, 11, and 11A of the first, second, and third embodiments shown in FIGS. 1, 4, and 5, the wiring portions 16 (16a and 16b) are respectively formed on both upper and lower sides of the transparent substrate 12 or 12a. However, the present invention is not limited to this, and in a manner similar to that of a conductive film 11B of a fourth embodiment of the present invention shown in FIG. 6, the following wiring structure may be adopted: the wiring portion 16 formed of the plurality of thin metal lines 14 may be formed on one surface (the upper surface in FIG. 6) of the transparent substrate 12, and the protective layers 20 are bonded to substantially the entire surfaces of the wiring portions 16 through the adhesive layers 18 so as to cover the thin metal lines 14.

Here, the thin metal lines 14 of the wiring portion 16 have a random mesh pattern 25 shown in FIG. 2.

A structure of the random mesh pattern of the conductive film of the present invention is described herein.

Figure 7:
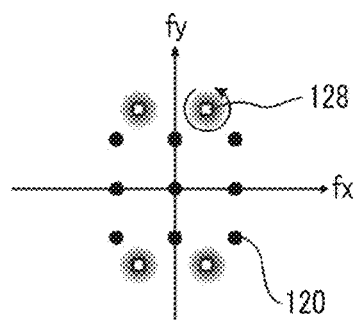
FIG. 7 is an explanatory view illustrating a state of distribution of noise components which distribute around frequency peaks of the random mesh pattern of the conductive film according to the present invention arranged with respect to a frequency peak of a black matrix of a display.
Figure 23A:
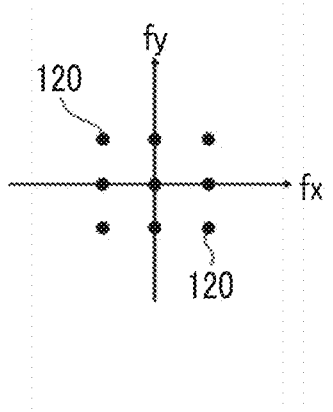
FIG. 23A is an explanatory view illustrating frequency peaks of a black matrix of the display disposed in a square lattice shape.
Figure 23B:
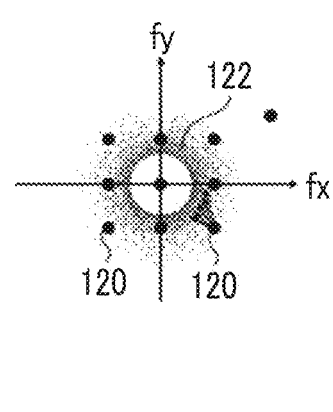
FIGS. 23B and 23C are respectively explanatory views illustrating states of distribution of frequency peaks of a Voronoi random mesh pattern which is disposed with respect to the frequency peaks of the black matrix shown in FIG. 23A and the random pattern in which anisotropy is one-dimensionally controlled.
Figure 23C:
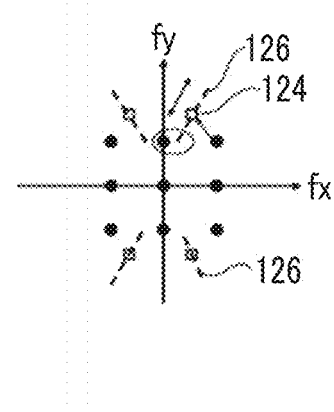

In addition, as shown in FIG. 7, in the random mesh pattern of the conductive film of the present invention, intensities of the Fourier spectrum peaks are distributed to be blurred around frequency peaks 128 of the random mesh pattern of the conductive film according to the present invention disposed with respect to frequency peaks 120 of the black matrix (BM) of the display. Thereby, a risk of visibility of moiré is reduced. In such a manner, in the random mesh pattern of the present invention, in a manner similar to a Voronoi random mesh pattern shown in FIG. 23B, Fourier spectrum intensities are prevented from being widely distributed. Further, in a manner similar to a regular mesh pattern shown in FIG. 23C, Fourier spectrum is localized to prevent moiré from being remarkably visually perceived.

Figure 8A:
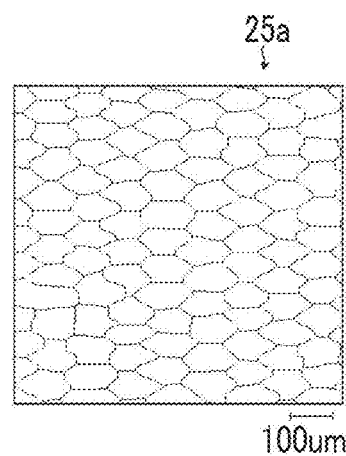
FIG. 8A is a plan view schematically illustrating another example of the random mesh pattern according to the present invention.
Figure 8B:
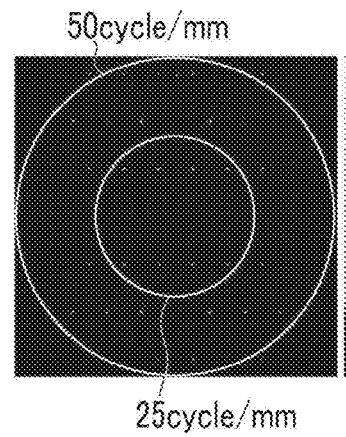
FIG. 8B is a schematic view illustrating an example of intensity characteristics of an FFT spectrum of the random mesh pattern shown in FIG. 8A.

Therefore, the present invention provides a random mesh pattern 25a having a structure shown in FIG. 8A. In the structure, the pattern has stronger peak intensities than the Voronoi random mesh pattern and has directivity, and has weaker peak intensities and also has weaker directivity than the regular pattern, that is, the pattern has median peak intensities and median directivity between both of them. The intensity characteristic of the FFT spectrum of such a random mesh pattern 25a of the present invention is shown in FIG. 8B.

As described above, in the random mesh pattern 25a of the present invention with the structure shown in FIG. 8A, the FFT spectrum of the pattern is characterized to have peaks at specific positions, and is characterized such that noise components two-dimensionally spread around the peaks.

Such a mesh pattern of the present invention can be specified in the following manner.

A common logarithm ΔIsp of a difference between the maximum value and the minimum value of the spectrum intensity (absolute value) Isp of the random mesh pattern 25a of the present invention shown in FIG. 8A in a single angular direction is taken for each predetermined angle unit, preferably, for each 0.1° throughout a range of 0 to 360° in a case where a value of 10,000 times an absolute value of the common logarithm is equal to or greater than −4.0. In this case, the common logarithm ΔIsp is represented by the graph shown in FIG. 9A. Here, the difference (intensity difference) ΔIsp between spectrum intensities for one angle can be calculated by Expression (1). Hereinafter, the value of 10,000 times the absolute value of the common logarithm of the spectrum is equal to or greater than −4.0.

$$\Delta Isp = 10,000 \times \{\log_{10}(Isp_{MAX} - Isp_{MIN})\} \quad (1)$$

Figure 9A:
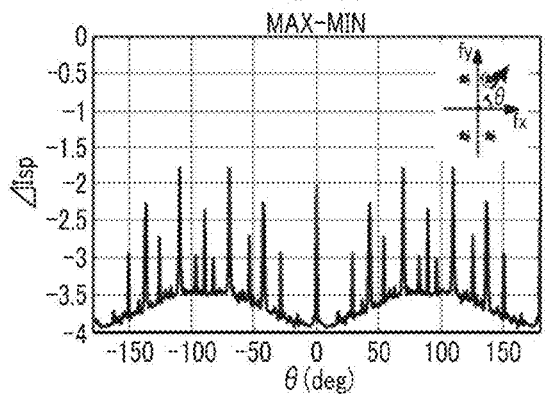
FIG. 9A is a graph illustrating an example of a value of a difference between the maximum value and the minimum value of an FFT spectrum intensity of the random mesh pattern according to the present invention shown in FIG. 8A in a single angular direction for each angle.

In such a manner, the ΔIsp can be calculated for each predetermined angle unit, preferably, for each of 0.1° throughout a range of 0 to 360°, and thereby the graph shown in FIG. 9A can be obtained.

Here, assuming that the difference Isp at an angle i is Isp(i) (i=1, 2, 3 . . . , 360), an average value Ispa of the intensity differences Isp at 0 to 360 degrees can be represented by Expression (2).

$$Ispa = \frac{1}{360} \sum_{k=1}^{360} \Delta Isp(k) \quad (2)$$

Figure 9B:
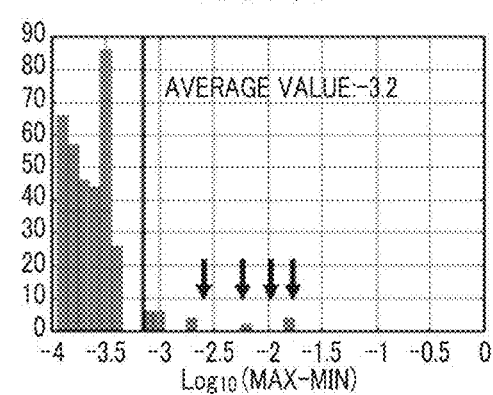
FIG. 9B is a histogram of the difference between the maximum value and the minimum value shown in FIG. 9A.

The histogram of the intensity differences ΔIsp(k) of the spectrum calculated as described above is obtained. Then, the intensity difference of the spectrum is taken for each 0.1 (Expression (1)) in the horizontal axis of the histogram, and the corresponding frequency is represented as a bar in the vertical axis thereof. For convenience of showing, a common logarithm value of 10 times the difference of the spectrum intensity is multiplied by 10,000, as shown in FIG. 9B. In the histogram shown in FIG. 9B, the average value Ispa is also indicated at the same time. In addition, in the examples shown in the drawings, the average value Ispa is −3.2.

In the random mesh pattern 25a of the present invention, in the histogram (refer to Expression (1)) shown in FIG. 9B, at the average value or more, that is, at the Ispa or more, there are discontinuous parts of the histogram, clusters, each of which includes one or more bars and which is isolated from the other cluster of the bars indicating the frequencies, that is, distributed parts (islands).

As described above, in the random mesh pattern of the present invention, there are islands of frequencies at the average value or more of the intensity differences in a case where the histogram of the intensity differences of the spectrum at all the angle points of 0 to 360 degrees.

Next, in the present invention, it is necessary for an angular direction variation (second sample standard deviation) of single direction variations (first sample standard deviation) of the absolute values of the common logarithms of the FFT spectra of the random mesh pattern to be in a specific numerical value range.

Figure 10:
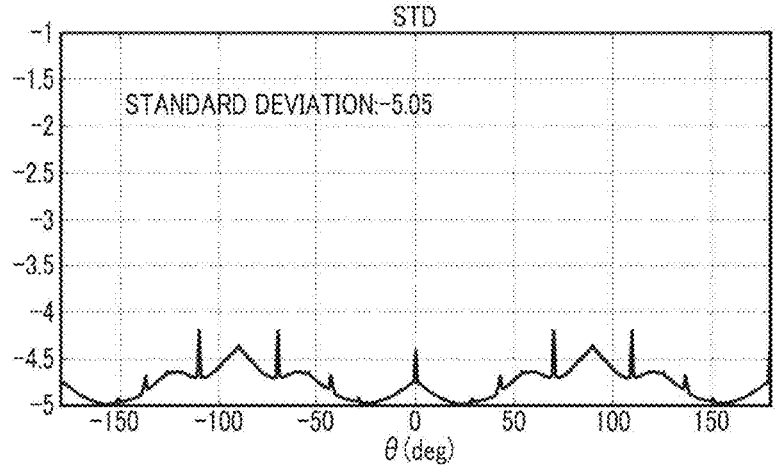
FIG. 10 is a graph illustrating an example of an angular direction variation of single angular direction variations of the FFT spectrum intensities shown in FIG. 9A.

Here, FIG. 10 shows the single direction variation of the FFT spectrum of the random mesh pattern.

Here, the single direction variation (sample standard deviation), that is, the i-direction variation x(i) (i=0.1, 0.2, . . . , 360) is calculated from the absolute values of the Fourier spectrum intensities at the maximum frequency of image data with respect to each angle of the random mesh pattern from 0 [cycle/mm] of the FFT spectrum of the random mesh pattern. The sample standard deviation of values of the single direction variation is acquired, and is defined as a value represented by a common logarithm.

Assuming that the single direction variation with respect to the angle i is sampled as x(i) 0.2, . . . , 360), an average value Xa of 360 samples can be represented by Expression (3). Assuming that variance of the samples is S2, the variance S2 of the samples can be represented by Expression (4). A square root S of the variance S2 of the samples obtained in such a manner can be calculated as a sample standard deviation by the following equation (5).

$$Xa = \frac{1}{360} \sum_{i=1}^{360} X(i) \quad (3)$$

$$S^2 = \frac{1}{359} \sum_{i=1}^{359} (X(i) - Xa)^2 \quad (4)$$

$$S = \sqrt{\frac{1}{359} \sum_{i=1}^{359} (X(i) - Xa)^2} \quad (5)$$

In the present invention, the sample standard deviation S is set as a pattern quantitative value (simply referred to as a quantitative value) indicating a characteristic of the random mesh pattern of the present invention. The quantitative value S is represented as the sample standard deviation, and therefore indicates the angular direction variation of the single direction variations of the FFT spectrum.

In the above-mentioned regular pattern, the single angular direction variations are set to be large. In the random mesh pattern, the single angular direction variations are set to be small. The variations of the present invention are in a range therebetween.

Accordingly, it is necessary for the quantitative value S of the present invention to be in the specific numerical value range.

Here, in the present invention, although described later in detail, the quantitative value (sample standard deviation) S is preferably in a range of −5.29 to −5.05 (−5.29≤S≤−5.05) and more preferably in a range of −5.29 to −5.11 (−5.29≤S≤−5.11) for each predetermined angle unit, preferably, for each 0.1° throughout the range of 0 to 360°.

In the example of FIG. 10, the quantitative value (sample standard deviation) S is −5.05, and there are islands of frequency peak values at an average value of −3.2 or more in the histogram of FIG. 9B. Therefore, it can be seen that the random mesh pattern 25a shown in FIG. 8A is the random mesh pattern of the present invention. It should be noted that the random mesh pattern 25a is a mesh pattern 13 in examples of the present invention to be described later.

It can be seen that the random mesh pattern shown in FIG. 11A is the random mesh pattern of the present invention in the following points. The quantitative value (sample standard deviation) S of the angular direction variation of single angular direction variations of the FFT spectrum intensities shown in FIG. 11B is −5.07. In the histogram shown in FIG. 11C, the average value is −3.23, and there are islands of the frequency peak values at the average value or more. It should be noted that the random mesh pattern is a mesh pattern 24 in examples of the present invention to be described later.

In addition, in the random mesh pattern shown in FIG. 11D, in the histogram shown in FIG. 11F, the average value is −3.59, and there are islands of the frequency peak values at the average value or more. However, the quantitative value (sample standard deviation) S of the angular direction variation of the single angular direction variations of the FFT spectrum intensities shown in FIG. 11E is −4.90, is out of a preferred range of the present invention. It should be noted that the random mesh pattern is a mesh pattern 27 in the comparative examples of the examples to be described later.

It can be seen that the random mesh pattern shown in FIG. 12A is the random mesh pattern of the present invention in the following points. The quantitative value (sample standard deviation) S of the angular direction variation of the single angular direction variations of the FFT spectrum intensities shown in FIG. 12B is −5.18. In the histogram shown in FIG. 12C, the average value is −3.57, and there are islands of the frequency peak values at the average value or more. It should be noted that the random mesh pattern is a mesh pattern 20 in the present invention examples to be described later.

In addition, the random mesh pattern shown in FIG. 12D is the random mesh pattern of the present invention in the following points. The quantitative value (sample standard deviation) S of the angular direction variation of the single angular direction variations of the FFT spectrum intensities shown in FIG. 12E is −5.17. In the histogram shown in FIG. 12F, the average value is −3.11, and there are islands of the frequency peak values at the average value or more. It should be noted that the random mesh pattern is a mesh pattern 14 in the present invention examples of the examples to be described later.

Figure 13:
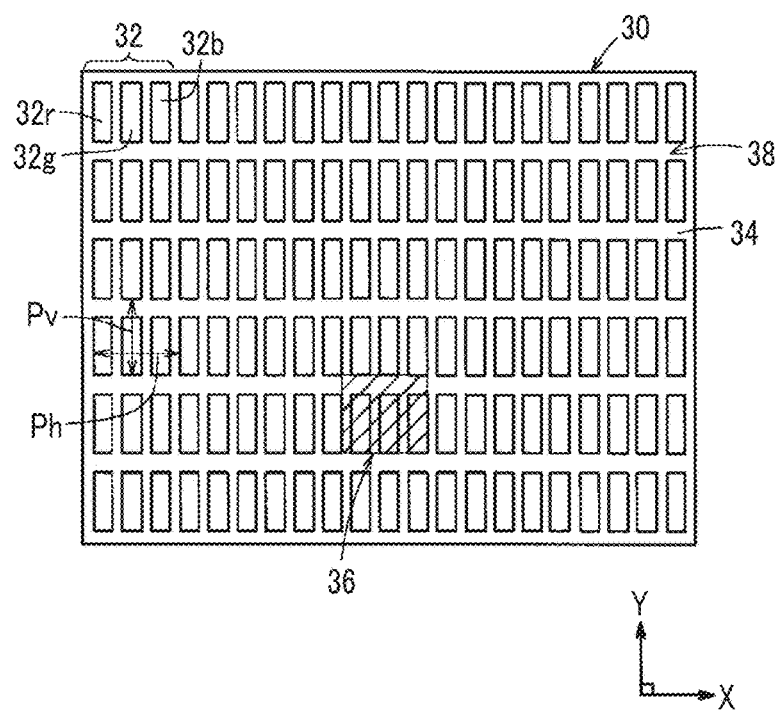
FIG. 13 is a schematic explanatory diagram illustrating an example of a pixel array pattern of a part of the display unit using the conductive film according to the present invention.

The above-mentioned conductive films 10, 11, 11A, and 11B of the first, second, third, and fourth embodiment of the present invention are applied to, for example, a touch panel (44: refer to FIG. 14) of a display unit 30 (display) schematically shown in FIG. 13, but have the random mesh pattern 25 which is excellent in terms of visibility of moiré regardless of the pixel structure and the resolution of the display.

In addition, in the present invention, the random mesh pattern excellent in terms of visibility of moiré (random mesh pattern) is defined as a single random mesh pattern or a group of two or more random mesh patterns making moiré not perceived by human visual sensation in a case where the BM pattern of the current color is formed as the random mesh pattern 25 which is a combined wiring pattern, regardless of the pixel structure and the resolution of the display, even in a case where any color light beam of the light beams with respective colors of the plurality of the sub-pixels of the display is emitted alone, from at least one point of view. In addition, in the present invention, even in a group of two or more random mesh patterns excellent in terms of visibility of moiré regardless of the pixel structure and the resolution of the display, it is possible to rank the random mesh patterns in order from the random mesh pattern making moiré not perceived to the random mesh pattern making moiré difficult to perceive. Thus, a single random mesh pattern making moiré most difficult to perceive is determined, and can be evaluated.

The conductive film according to the present invention basically has the above-mentioned configuration.

FIG. 13 is a schematic explanatory diagram schematically illustrating an example of a pixel array pattern of a part of the display unit using the conductive film of the present invention.

As the part thereof is shown in FIG. 13, the display unit 30 has a plurality of pixels 32 arranged in a matrix shape to constitute a predetermined pixel array pattern. Each pixel 32 has a configuration in which three sub-pixels (a red sub-pixel 32r, a green sub-pixel 32g, and a blue sub-pixel 32b) are arranged in a horizontal direction. Each sub-pixel has a quadrilateral shape which is long in the vertical direction. The arrangement pitch (horizontal pixel pitch Ph) of the pixels 32 in the horizontal direction and the arrangement pitch (vertical pixel pitch Pv) of the pixels 32 in the vertical direction are substantially equal to each other. That is, a shape (refer to a region 36 indicated by hatching), which is formed of a single pixel 32 and a black matrix (BM) 34 (pattern material) surrounding the single pixel 32, is a square shape. Further, an aspect ratio of the single pixel 32 is not 1, and satisfies the following expression: a length thereof in the horizontal (transverse) direction>a length thereof in the vertical (longitudinal) direction.

As can be clearly seen from FIG. 13, the pixel array pattern formed of the sub-pixels 32r, 32g, and 32b of each of the plurality of pixels 32 is defined by a BM pattern 38 of BMs 34 respectively surrounding the sub-pixels 32r, 32g, and 32b. Moiré, which occurs in a case where the conductive film 10, 11, 11A, or 11B is superposed on the display unit 30, is caused by interference between the BM pattern 38 of the BMs 34 of the display unit 30 and the wiring pattern 24 of the conductive film 10, 11, 11A, or 11B. Therefore, precisely, the BM pattern 38 is an inverted pattern of the pixel array pattern, but here, these patterns are regarded as the same patterns.

For example, the conductive film 10, 11, 11A, or 11B may be disposed on a display panel of the display unit 30 having the BM pattern 38 formed by the BMs 34. In this case, the wiring pattern 24 (a combined wiring pattern of the wiring patterns 24a and 24b) of the conductive film 10, 11, HA, or 11B, in which at least one of the wiring patterns 24a and 24b is a random mesh pattern 25, is optimized in terms of visibility of moiré with respect to the BM (pixel array) pattern 38. Therefore, there is no interference in spatial frequency between the array cycle of the pixels 32 and the wiring array of the thin metal lines 14 of the conductive film 10, 11, 11A, or 11B, and occurrence of moiré is suppressed. As a result, the conductive film is excellent in terms of visibility of moiré. Hereinafter, the conductive film 10 will be described as a representative example, but the description is the same as those of the conductive film 11, 11A, or 11B.

It should be noted that the display unit 30 shown in FIG. 13 may be formed as a display panel such as a liquid crystal panel, a plasma panel, an organic EL panel, or an inorganic EL panel, and an emission intensity thereof may be different in accordance with a resolution.

The BM pattern and the emission intensity of the display, which can be applied to the present invention, is not particularly limited, and may be the same as the BM pattern and the emission intensity of a known display. For example, as shown in FIGS. 15(A), 15(B), 16A, 16B, and 16C, a display such as OLED having different cycles and intensities of the respective colors of RGB may be used. A display, which is formed of RGB sub-pixels having the same shapes as shown in FIGS. 16A and 16B and in which an intensity variation of the sub-pixels is large, or a display, in which an intensity variation of the sub-pixels is small and only a G sub-pixel (channel) having a highest intensity is considered, may be used. In particular, a display such as a smartphone or a tablet having a high intensity may be used.

Figure 15:
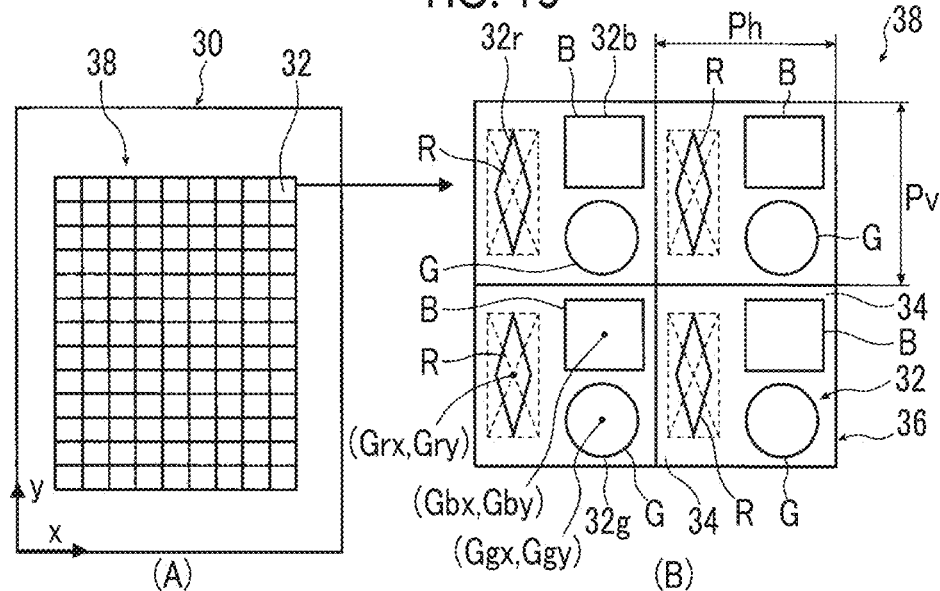
FIGS. 15(A) and 15(B) are respectively schematic explanatory diagrams illustrating an example of a part of pixel array patterns of a display unit using the conductive film according to the present invention.
Figure 16A:
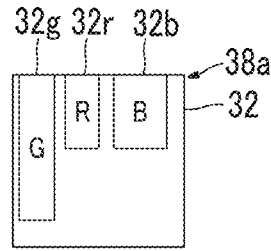
FIGS. 16A to 16C are respectively schematic explanatory diagrams illustrating examples of constituent units of pixel array patterns in which at least either shapes or cycles of three sub-pixels applied to the present invention are different.
Figure 16B:
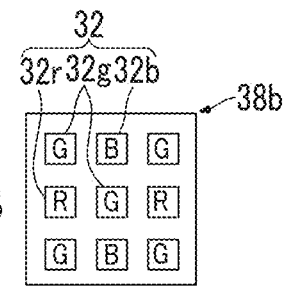

FIGS. 15(A) and 15(B) are respectively a schematic explanatory diagram illustrating an example of a part of pixel array patterns of a display unit using the conductive film according to the present invention, and a partially enlarged view of the part.

As shown in FIG. 15(A), the display unit 30 has a plurality of pixels 32 arranged in a matrix shape to constitute a predetermined pixel array pattern. As shown in FIG. 13, each pixel 32 has a configuration in which three sub-pixels (a red sub-pixel 32r, a green sub-pixel 32g, and a blue sub-pixel 32b) are arranged in a horizontal direction.

In the present invention, it is necessary for the pixel array pattern of the display unit to satisfy any of the following three conditions: a condition in which at least two sub-pixels among a plurality of sub-pixels in a single pixel, the three sub-pixels in the example shown in the drawing, have different shapes; a condition in which cycles of sub-pixel array patterns formed by arrays each corresponding to at least two sub-pixels among a plurality of (three) sub-pixels in a single pixel are different; or a condition in which a plurality of (three) sub-pixels in a single pixel is not lined up in a single direction. In addition, in the present invention, the cycles of the sub-pixel array patterns, that is, the cycles of the sub-pixels (color filters) also include a cycle of sub-pixels in a single pixel.

In the example shown in FIG. 15(B), each sub-pixel 32r has a rhombic shape that is vertically long in the y (vertical) direction in the drawing, and is disposed on the left side of each square-shaped pixel 32 in the drawing, each sub-pixel 32g has a circular shape, and is disposed on the lower right side of the pixel 32 in the drawing, and each sub-pixel 32b has a quadrilateral shape (square shape), and is disposed on the upper right side of the pixel 32 in the drawing. In the display unit 30 shown in FIGS. 15(A) and 15(B), a pixel array pattern 38 corresponds to a case where forms of three sub-pixels 32r, 32g, and 32b within a single pixel are different such that intensities thereof are different, and corresponds to a case where a plurality of (three) sub-pixels in a single pixel is not lined up in a single direction.

In the example shown in the drawing, the arrangement pitch (horizontal pixel pitch Ph) of the pixels 32 in the horizontal direction and the arrangement pitch (vertical pixel pitch Pv) of the pixels 32 in the vertical direction are substantially equal to each other, and are referred to as a pixel pitch Pd. That is, a region, which is formed of the three sub-pixels 32r, 32g, and 32b of a single pixel 32, and a pixel region 36, which is formed of a black matrix (BM) 34 (pattern material) surrounding the sub-pixels 32r, 32g, and 32b, have square shapes. It should be noted that the pixel region 36 corresponds to a single pixel 32, and therefore the pixel region 36 is hereinafter also referred to as a pixel.

It should be noted that the pixel pitch Pd (the horizontal or vertical pixel pitch Ph or Pv) may have any value if it is a pitch corresponding to a resolution of the display unit 30, and may be, for example, a pitch in a range of 84 μm to 264 μm.

In the examples shown in the drawing, the shapes of the sub-pixels 32r, 32g, and 32b within one pixel are respectively a rhomboid, a circle, and a rectangle. However, the present invention is not limited to this, and the shape may be any shape if there is provided the pixel array pattern 38. In the pixel array pattern 38, three sub-pixels having the same forms shown in FIG. 13 are lined up in the horizontal direction of the drawing, each pixel 32 is repeated in the horizontal direction and the vertical direction, and the cycles and intensities of the sub-pixels (color filters) are the same for the three sub-pixels of RGB.

Figure 16C:
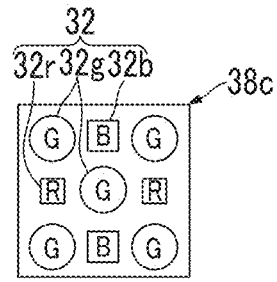

Alternatively, the sub-pixels (color filters) 32r, 32g, and 32b having opening shapes called a pin tile structure shown in FIGS. 16A to 16C may be used. In addition, there may be provided pixel array patterns each of which is formed of the sub-pixels 32r, 32g, and 32b.

As shown in FIG. 16A, the forms of the three sub-pixels 32r, 32g, and 32b of the pixel 32 may be different (the shapes may be rectangles, but the sizes thereof may be different). This case corresponds to the case where the intensities thereof are different. In this case, it can be said that the cycles of the sub-pixels are the same.

That is, in the example shown in FIG. 16A, the pixel array pattern 38a is formed such that each pixel is formed of the three sub-pixels 32r, 32g, and 32b having different forms. Any of the cycles of the respective sub-pixel array patterns of the three sub-pixels 32r, 32g, and 32b is the same as the cycle of the pixel array pattern 38a.

It should be noted that in the present invention, the condition, in which the forms of the sub-pixels are different, is defined to include not only a case where the shapes of the sub-pixels are different but also a case where the sizes of the sub-pixels are different.

As shown in FIG. 16B, even in a case where the forms of the three sub-pixels 32r, 32g, and 32b are the same, a repetition cycle (the cycle of the sub-pixel array pattern) of the sub-pixels 32g may be different from repetition cycle of the sub-pixels 32r and 32b. In this example, the cycle of the sub-pixels 32g is a half of the cycle of the sub-pixels 32r and 32b. In this case, it can be said that the intensities of the sub-pixels are the same.

That is, in the example shown in FIG. 16B, a pixel array pattern 38b is formed such that each pixel 32 is formed of four sub-pixels including the two sub-pixels 32g and the sub-pixels 32r and 32b. Either of the cycles of the respective sub-pixel array patterns of the sub-pixels 32r and 32b is the same as the cycle of the pixel array pattern 38a. The cycle of the sub-pixel array pattern of the sub-pixels 32g is a half of the cycle of the pixel array pattern 38a.

As shown in FIG. 16C, the repetition cycle (the cycle of the sub-pixel patterns) and the form (both the shape and the size) of the sub-pixels 32g may be different from those of the sub-pixels 32r and 32b. This case corresponds to the case where both the cycles and the intensities of the sub-pixels are different.

That is, in the example shown in FIG. 16C, in a manner similar to the example shown in FIG. 16B, a pixel array pattern 38c is formed such that each pixel 32 is formed of four sub-pixels including the two sub-pixels 32g and the sub-pixels 32r and 32b. Either of the cycles of the respective sub-pixel array patterns of the sub-pixels 32r and 32b is the same as the cycle of the pixel array pattern 38a. The cycle of the sub-pixel array pattern of the sub-pixels 32g is a half of the cycle of the pixel array pattern 38a.

Figure 17A:
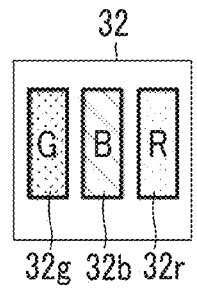
FIGS. 17A and 17B are respectively explanatory diagrams schematically illustrating examples of variations of intensities of three sub-pixels in the pixels of the pixel array pattern of the display unit shown in FIG. 13.
Figure 17B:
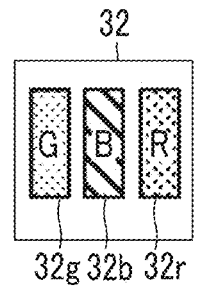

FIG. 17A shows a BM structure of a pixel in which an intensity variation of GBR sub-pixels is large and which is formed of RGB sub-pixels having the same shapes. FIG. 17B shows a BM structure of a pixel in which an intensity variation of GBR sub-pixels is small and which is formed of RGB sub-pixels having the same shapes. Considering only a G sub-pixel having a highest intensity, a wiring pattern of the conductive film can be designed.

The resolutions and shapes of the BM1 to BM9 each having 2×2 pixels of the display used in the present invention are shown in FIGS. 18A to 18I. Resolutions or shapes of the respective BM1 to BM9 shown in FIGS. 18A to 18I are different. FIGS. 18A to 18I show only the G channel (G sub-pixels), and do not show the B channel (B sub-pixels) and the R channel (R sub-pixels), but it is apparent that the resolutions and the shapes thereof are the same.

FIG. 18A shows four G sub-pixels having reed shapes, at a resolution of 98 dpi, and corresponds to the BM1 of BM No. 1 used in the example to be described later.

FIG. 18B shows four G sub-pixels having plate shapes, which are slightly curved and of which the lower sides are partially missing in the drawing, at a resolution of 151 dpi, and corresponds to the BM2 of BM No. 2 used in the example to be described later.

FIG. 18C shows four G sub-pixels, which have plate shapes slightly curved and are disposed to be biased toward the left side in the drawing, at a resolution of 151 dpi, and corresponds to the BM3 of BM No. 3 used in the example to be described later.

FIG. 18D shows four G sub-pixels having band shapes in which a plurality of thin bands leaning in the horizontal direction leans in the up and down opposite directions in the drawing, at a resolution of 151 dpi, and corresponds to the BM4 of BM No. 4 used in the example to be described later.

FIG. 18E shows four G sub-pixels having plate shapes, of which the upper and lower sides are partially missing in the drawing, at a resolution of 151 dpi, and corresponds to the BM5 of BM No. 5 used in the example to be described later.

FIG. 18F shows four G sub-pixels, which have plate shapes thinly elongated in the vertical direction and are disposed to be biased toward the left side in the drawing, at a resolution of 218 dpi, and corresponds to the BM6 of BM No. 6 used in the example to be described later.

FIG. 18G shows four G sub-pixels, which have plate shapes elongated in the vertical direction and are disposed to be biased toward the right side in the drawing, at a resolution of 218 dpi, and corresponds to the BM7 of BM No. 7 used in the example to be described later.

FIG. 18H shows four G sub-pixels having plate shapes, of which the lower sides are partially missing in the drawing, at a resolution of 245 dpi, and corresponds to the BMS of BM No. 8 used in the example to be described later.

FIG. 18I shows four G sub-pixels having plate shapes, which are elongated in the horizontal direction in the drawing, at a resolution of 265 dpi, and corresponds to the BM9 of BM No. 9 used in the example to be described later.

For example, the conductive film 10, 11, 11A, or 11B may be disposed on a display panel of the display unit 30 having the BM pattern 38 formed by the BM34 that defines the above-mentioned sub-pixel array pattern of RGB. In this case, the wiring pattern 24 is a random mesh pattern that is excellent in terms of visibility of moiré regardless of the resolution and the shape of the BM (pixel array) pattern 38 including the sub-pixel array patterns of RGB. Therefore, there is almost no interference in spatial frequency between the array cycle or intensity of the pixels 32 and the wiring array of the thin metal lines 14 of the conductive film 10, 11, 11A, or 11B, and occurrence of moiré is suppressed.

Figure 14:
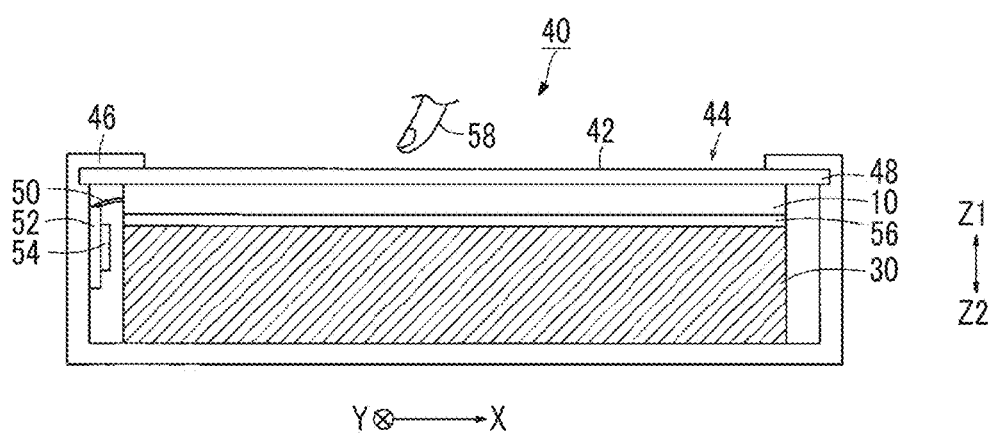
FIG. 14 is a schematic cross-sectional view of one example of a display device provided with the conductive film shown in FIG. 1.

Next, a display device, in which the conductive film according to the present invention is incorporated, will be described with reference to FIG. 14. In FIG. 14, a projected capacitive type touch panel, in which the conductive film 10 according to the first embodiment of the present invention is incorporated, will be described as a representative example of a display device 40, but it is needless to say that the present invention is not limited to this example.

As shown in FIG. 14, the display device 40 includes the display unit 30 (refer to FIG. 13) that can display a color image and/or a monochrome image, a touch panel 44 that detects a contact position on an input surface 42 (located on the side as directed by the arrow Z1), and a housing 46 in which the display unit 30 and the touch panel 44 are housed. A user is able to access the touch panel 44 through a large opening portion provided in one surface (on the side as directed by the arrow Z1) of the housing 46.

The touch panel 44 includes not only the conductive film 10 (refer to FIGS. 1 and 2) described above but also a cover member 48 stacked on one surface (on the side as directed by the arrow Z1) of the conductive film 10, a flexible substrate 52 electrically connected to the conductive film 10 through a cable 50, and a detection control unit 54 disposed on the flexible substrate 52.

The conductive film 10 is bonded to one surface (on the side directed by the arrow Z1) of the display unit 30 through an adhesive layer 56. The conductive film 10 is disposed on the display screen such that the other main surface side (second conductive portion 16b side) is opposite to the display unit 30.

The cover member 48 functions as the input surface 42 by covering one surface of the conductive film 10. In addition, by preventing a contact member 58 (for example, a finger or a stylus pen) from coming into direct contact with the conductive film 10, it is possible to suppress the occurrence of a scratch, adhesion of dust, and the like, and thus it is possible to stabilize conductivity of the conductive film 10.

The material of the cover member 48 may be, for example, glass or a resin film. One surface (on the side as directed by the arrow Z2) of the cover member 48 may be coated with silicon oxide or the like, and may be adhered to one surface (on the side as directed by the arrow Z1) of the conductive film 10. Further, in order to prevent damage due to rubbing or the like, the conductive film 10 and the cover member 48 may be configured to be bonded to each other.

The flexible substrate 52 is an electronic substrate having flexibility. In the example shown in this diagram, the flexible substrate 52 is fixed to an inner wall of the housing 46, while the position of the substrate may be varied. The detection control unit 54 constitutes an electronic circuit that catches a change in the capacitance between the contact member 58 and the conductive film 10 and detects the contact position (or the approach position) in a case where the contact member 58 as a conductor is brought into contact with (or comes closer to) the input surface 42.

The display device, to which the conductive film according to the present invention is applied, basically has the above-mentioned configuration.

Next, in the present invention, processes of a method of evaluating and determining the wiring pattern of the conductive film, which is excellent in terms of visibility of moiré regardless of the resolution and pixel (sub-pixel or color filter) structure of the pixel array (BM) pattern of the display device, and a method of evaluating the conductive film will be described. That is, a description will be given of processes of evaluating and determining the random mesh-shaped wiring pattern, which makes moiré not perceived by human visual sensation regardless of the predetermined pixel array (BM) pattern of the display device, and thereby evaluating the conductive film, in the conductive film of in the present invention.

Figure 21:
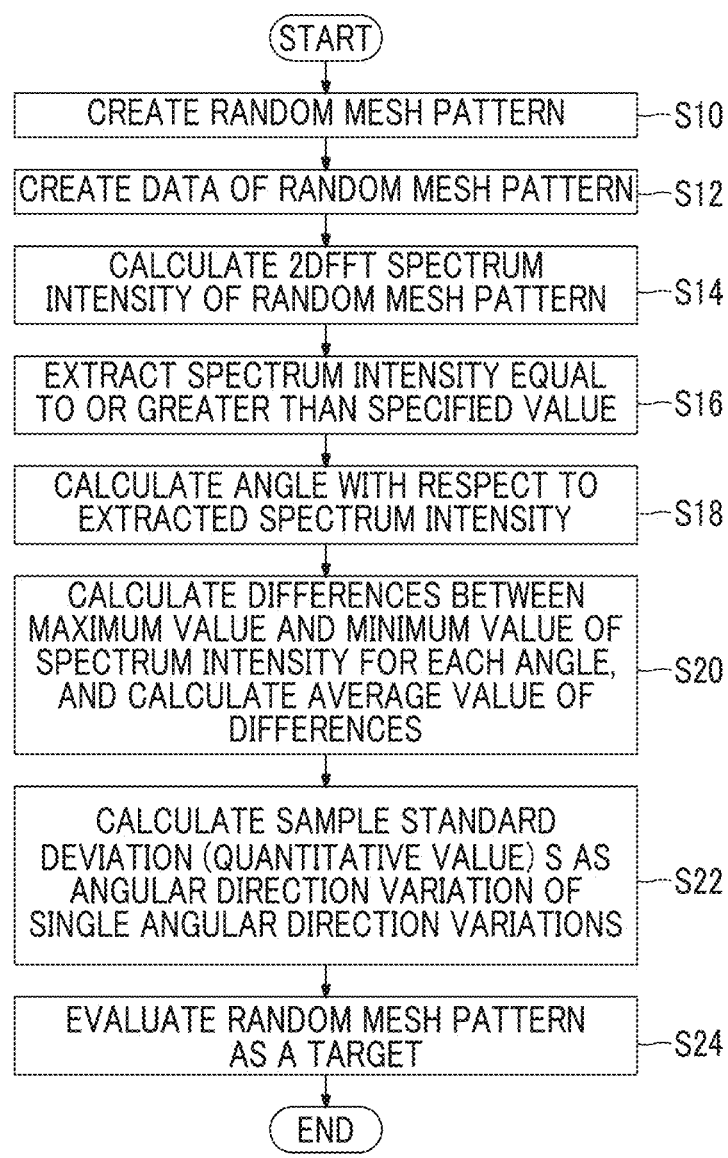
FIG. 21 is a flowchart illustrating an example of a method of calculating a quantitative value of the random mesh pattern of the conductive film according to the present invention.
Figure 22:
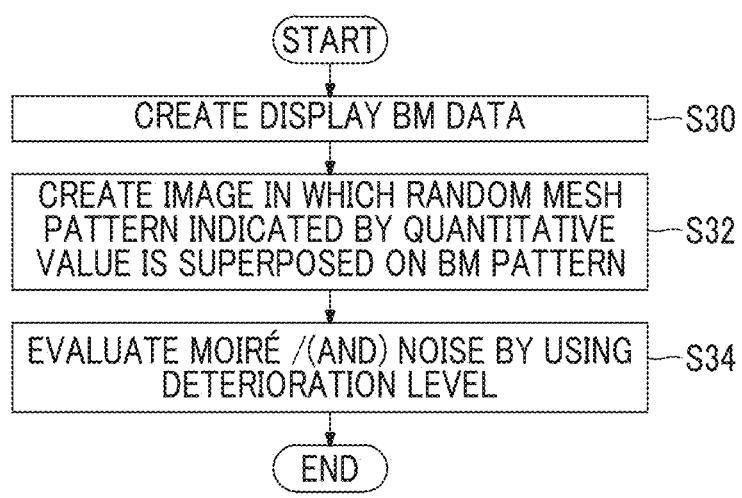
FIG. 22 is a flowchart illustrating an example of the method of evaluating the quantitative value of the random mesh pattern of the conductive film of the present invention.

FIG. 21 is a flowchart illustrating an example of a method of evaluating the conductive film of the present invention.

In the method for evaluating the wiring pattern of the conductive film of the present invention, at first, in step S10, a random mesh-shaped wiring pattern (random mesh pattern) of the conductive film is produced.

First, as shown in FIG. 3A described above, seed points p, which serve as centers of gravity of closed sections such as rhomboids in one planar region 100, are generated at a plurality of positions which are randomly selected with arbitrary intervals on the basis of, for example, random numbers and standard deviations.

Next, as shown in FIG. 3B, in consideration of the rhomboid patterns 104 which serve as opening portions 22 at the positions of the seed points p arranged in the planar region 100, the rhomboid patterns image 108 is produced.

Subsequently, in order to thin lines of the boundary region 106 of the rhomboid pattern image 108 shown in FIG. 3B, thinning processing, for example, thinning processing of Matlab produced by Mathworks Corp. is performed, and then the random mesh pattern 25 shown in FIG. 2 is produced.

Here, at the corners of the image, the closed sections are not formed, and thus the central section of the image is cut out.

It should be noted that in the example to be described later, the central section was cut out, and an image of 5589 pix×5589 pix was used.

In such a manner, the pattern quantitative value of the random mesh pattern 25 produced in step S10 is calculated.

First, in Step S12, in order to quantify the random mesh pattern, transmittance data of the random mesh pattern 25 produced in step S10 is created.

Next, in step S14, by performing two-dimensional fast Fourier transform (2DFFT (base 2)) on the transmittance image data of the random mesh pattern created in step S12 and by quantifying transmittance image data, a spatial frequency of the spectrum peak and a peak spectrum intensity are calculated. At this time, it is preferable that the calculated spectrum intensities of all the images are normalized by an average value and an image size (width×height). It should be noted that, after the normalization, the calculated average value does not have to be used.

Next, in step S16, spectrum intensities equal to or greater than a specified value are extracted from the spectrum intensities calculated in step S14. Here, regarding the spectrum intensities which are calculated in step S14 and are necessary for quantification, logarithms of 10 times the intensities are equal to or greater than −4.0, that is, $\log_{10}$ (intensity)≥−4.0. The reason for this is that, since a weak signal having an intensity of less than −4.0 is noise and it becomes an error factor of the quantitative value to be calculated later, the signal may be ignorable.

Next, in step S18, for the spectra having the spectral intensities (equal to or greater than −4.0) extracted in step S16, an angle θ is calculated as shown in FIG. 19. The angle θ is obtained by calculating a value of the angle up to two decimal places (the second decimal place) and rounding off the value with two decimal places to one decimal place (the first decimal place).

Here, assuming that the angle θ is an angle obtained by calculating θ2 up to two decimal places, and is an angle obtained by calculating θ1 up to one decimal place, θ1 is rounded off to a nearest integer by θ1=round(10θ2)/10, and thereafter returns to one decimal place.

It should be noted that the rounding function "round" is represented by a function of Matlab. Here, Y=round(X) rounds off a component of X to the nearest integer. The positive component, of which a decimal part is 0.5, is rounded off to the nearest positive integer. The negative component, of which a decimal part is −0.5, is rounded off to the nearest negative integer. In a case where X is a complex number, the real part and the imaginary part are individually rounded off. It should be noted that the rounding function "round" refers to http: jp.mathworks.com/help/Matlab/ref/round.html.

Next, in step S20, by oscillating the angle θ calculated in step S18 by each of 0.1°, at all the angles of 0 to 360 degrees, a difference (intensity difference=maximum value−minimum value) between the maximum value and the minimum value of the spectrum intensity is calculated for each angle, and an average value of the intensity differences is calculated.

FIG. 20B shows a histogram of the intensity differences (maximum value−minimum value) calculated in such a manner.

At the same time, in step S22, by oscillating the angle θ calculated in step S18 by each of 0.1°, at all the angles of 0 to 360 degrees, a sample standard deviation indicating an angular direction variation of the single angular direction variations is calculated as a quantitative value of the pattern.

FIG. 20A shows the standard deviation of the spectrum intensities for the respective calculated angles. In such a manner, as the pattern quantitative value, the sample standard deviation, which indicates an angle variation of the standard deviation of the spectrum intensities for respective angles, is calculated from the standard deviation of the standard deviation of the spectrum intensities for the respective angles shown in FIG. 20A.

Finally, in step S24, the random mesh pattern as a target is evaluated on the basis of whether or not there are islands of peak values at the average value or more of the intensity differences and the pattern quantitative value (sample standard deviation) obtained in step S22 and calculated in FIG. 20A, from the histogram of the intensity differences (maximum value−minimum value) obtained in step S20 and shown in FIG. 20B.

Here, the random mesh pattern, in which there are islands of peak values at the average value or more of the intensity differences and the pattern quantitative value (sample standard deviation) is in a predetermined numerical value range, for example, a range of −5.29 to −5.05, is determined and evaluated as a wiring pattern of the conductive film of the present invention.

The random mesh pattern 25, which is evaluated in such a manner and is shown in FIG. 2, can be determined and evaluated as a wiring pattern of the conductive film of the present invention.

In such a manner, the method of determining the wiring pattern of the conductive film of the present invention is terminated, and the evaluated random mesh patterns can be evaluated as the wiring pattern of the conductive film of the present invention.

As a result, it is possible to produce the conductive film of the present invention having the random mesh pattern which is excellent in terms of visibility of moiré, regardless of the resolution and the pixel structure, even at a different resolution and even in a display device having a different pixel structure, even in a case where the conductive film is superposed on the BM pattern of the display unit of the display device.

Hereinbefore, the conductive film according to the present invention, the display device comprising the conductive film, and the method of evaluating the patterns of the conductive film have been described with reference to various embodiments and examples. However, it is apparent that the present invention is not limited to the embodiments and the examples and may be improved or modified in various forms without departing from the scope of the present invention.

EXPERIMENTAL EXAMPLE

Hereinafter, the present invention will be described in detail with reference to an experimental example.

In the present example, in accordance with the flow of the method of evaluating the conductive film of the present invention shown in FIG. 21, in a manner similar to the above description, an experiment was performed as follows.

In accordance with the flow of the method of evaluating the conductive film shown in FIG. 21, 46 kinds of the mesh pattern 1 to 46 are produced, spectrum anisotropy (directivity) of the 46 kinds of the produced mesh patterns was quantified. Table 1 shows the 46 kinds of the produced mesh patterns 1 to 46.

A brief overview of the mesh patterns 1 to 46 shown in Table 1 was as follows.

The mesh patterns 1 to 9 were Voronoi random patterns each of which was formed of Voronoi polygons, and respectively have average pitches in a range of 200 μm to 300 μm and line widths in a range of 2 μm to 6 μm.

The mesh patterns 10 and 11 were regular patterns in which opening shapes were hexagons, a length of one side of each opening shape was in a range of 100 μm to 200 μm, a line width thereof was 2 μm, and centroids of the openings were not distributed.

The mesh patterns 12 to 21 were random patterns in which the opening shapes were rhomboids, an angle of an oblique side of each opening shape was in a range of 20° to 40°, a length of the oblique side was in a range of 50 μm to 200 μm, all the line widths of opening shapes were 2 μm, and centroids of the openings were distributed by 5% as an average value.

The mesh patterns 22 and 23 were regular patterns in which opening shapes were hexagons, a length of one side of each opening shape was in a range of 100 μm to 200 μm, a line width thereof was 2 μm, and centroids of the openings were distributed by 5% as an average value.

The mesh patterns 24 and 25 were random patterns in which the opening shapes were parallelograms, an angle of the oblique side of each opening shape with respect to the bottom side was 30°, a length of one side (bottom side) thereof was a range of 100 μm to 200 μm, a line width thereof was 2 μm, and centroids of the openings were distributed by 5% as an average value.

The mesh patterns 26 to 29 were regular patterns in which opening shapes were squares, a length of one side of each opening shape was in a range of 50 μm to 200 μm, a line width thereof was 2 μm, and centroids of the openings were distributed by 5% as an average value.

The mesh patterns 30 to 40 were regular patterns in which the opening shapes were rhomboids, an angle of an oblique side of each opening shape was in a range of 20° to 40°, a length of the oblique side was in a range of 50 μm to 200 μm, all the line widths of opening shapes were 2 μm, and centroids of the openings were not distributed.

The mesh patterns 41 and 42 were regular patterns in which the opening shapes were parallelograms, an angle of the oblique side of each opening shape with respect to the bottom side was 30°, a length of one side (bottom side) thereof was a range of 100 μm to 200 μm, a line width thereof was 2 μm, and centroids of the openings were not distributed.

The mesh patterns 43 to 46 were regular patterns in which opening shapes were squares, a length of one side of each opening shape was in a range of 50 μm to 200 μm, a line width thereof was 2 μm, and centroids of the openings were not distributed.

Subsequently, it is necessary to clarify a numerical value range in which image quality is good. Therefore, the following points were verified through simulation.

In Table 2, display BM image data of 9 kinds of the BM1 to BM9 having a transmission part of 1.0 and a blocking part of 0 at different resolutions in cases of different opening shapes (pixel structures) shown in FIG. 18A to 18I was created at 12,700 dpi. Table 2 shows resolutions of the display BMs of 9 kinds of the BM1 to BM9.

Images, in which the mesh patterns indicated by the pattern quantitative values were superposed on the display BMs, were created, and three researchers performed functional evaluation on moiré with the following levels of deterioration.

In a case where deterioration is not observed, the level is set to 5. In a case where deterioration is observed but does not offer a sense of discomfort, the level thereof is set to 4. In a case where deterioration is observed and offers a weak sense of discomfort, the level is set to 3. In a case where deterioration is observed and offers a sense of discomfort, the level is set to 2. In a case where deterioration is observed and offers a strong sense of discomfort, the level is set to 1.

The boundary, at which it was determined that the pattern was good in terms of visibility, was set to 3.3.

Table 3 shows moiré evaluation results expressed by combinations between 48 kinds of pattern examples of the mesh patterns and 9 kinds of the display BMs. In Table 3, the horizontal axis represents the BM types and the vertical axis represents the pattern examples, and the evaluation results based the deterioration levels and the pattern quantitative values are described.

TABLE 1

| Mesh Pattern | | | | | |
|---|---|---|---|---|---|
| 1 | Voronoi Polygon | Random | Average Pitch 200 μm | Line Width 2 μm | |
| 2 | Voronoi Polygon | Random | Average Pitch 200 μm | Line Width 4 μm | |
| 3 | Voronoi Polygon | Random | Average Pitch 200 μm | Line Width 6 μm | |
| 4 | Voronoi Polygon | Random | Average Pitch 250 μm | Line Width 2 μm | |
| 5 | Voronoi Polygon | Random | Average Pitch 250 μm | Line Width 4 μm | |
| 6 | Voronoi Polygon | Random | Average Pitch 250 μm | Line Width 6 μm | |
| 7 | Voronoi Polygon | Random | Average Pitch 300 μm | Line Width 2 μm | |
| 8 | Voronoi Polygon | Random | Average Pitch 300 μm | Line Width 4 μm | |
| 9 | Voronoi Polygon | Random | Average Pitch 300 μm | Line Width 6 μm | |
| 10 | Hexagon | No Variation in Opening Center | Length of One Side 100 μm | Line Width 2 μm | |
| 11 | Hexagon | No Variation in Opening Center | Length of One Side 200 μm | Line Width 2 μm | |
| 12 | Rhomboid | 5% Variation in Opening Center | Angle of Oblique Side 20° | Length 200 μm | Line Width 2 μm |
| 13 | Rhomboid | 5% Variation in Opening Center | Angle of Oblique Side 20° | Length 50 μm | Line Width 2 μm |
| 14 | Rhomboid | 5% Variation in Opening Center | Angle of Oblique Side 30° | Length 100 μm | Line Width 2 μm |

TABLE 1-continued

| Mesh Pattern | | | | | |
|---|---|---|---|---|---|
| 15 | Rhomboid | 5% Variation in Opening Center | Angle of Oblique Side 30° | Length 150 μm | Line Width 2 μm |
| 16 | Rhomboid | 5% Variation in Opening Center | Angle of Oblique Side 30° | Length 200 μm | Line Width 2 μm |
| 17 | Rhomboid | 5% Variation in Opening Center | Angle of Oblique Side 30° | Length 50 μm | Line Width 2 μm |
| 18 | Rhomboid | 5% Variation in Opening Center | Angle of Oblique Side 40° | Length 100 μm | Line Width 2 μm |
| 19 | Rhomboid | 5% Variation in Opening Center | Angle of Oblique Side 40° | Length 150 μm | Line Width 2 μm |
| 20 | Rhomboid | 5% Variation in Opening Center | Angle of Oblique Side 40° | Length 200 μm | Line Width 2 μm |
| 21 | Rhomboid | 5% Variation in Opening Center | Angle of Oblique Side 40° | Length 50 μm | Line Width 2 μm |
| 22 | Hexagon | 5% Variation in Opening Center | Length of One Side 100 μm | Line Width 2 μm | |
| 23 | Hexagon | 5% Variation in Opening Center | Length of One Side 200 μm | Line Width 2 μm | |
| 24 | Parallelogram | 5% Variation in Opening Center | Angle of Oblique Side 30° | Length 100 μm | Line Width 2 μm |
| 25 | Parallelogram | 5% Variation in Opening Center | Angle of Oblique Side 30° | Length 200 μm | Line Width 2 μm |
| 26 | Square | 5% Variation in Opening Center | Length of One Side 100 μm | Line Width 2 μm | |
| 27 | Square | 5% Variation in Opening Center | Length of One Side 150 μm | Line Width 2 μm | |
| 28 | Square | 5% Variation in Opening Center | Length of One Side 200 μm | Line Width 2 μm | |
| 29 | Square | 5% Variation in Opening Center | Length of One Side 50 μm | Line Width 2 μm | |
| 30 | Rhomboid | No Variation in Opening Center | Angle of Oblique Side 20° | Length 150 μm | Line Width 2 μm |
| 31 | Rhomboid | No Variation in Opening Center | Angle of Oblique Side 20° | Length 200 μm | Line Width 2 μm |
| 32 | Rhomboid | No Variation in Opening Center | Angle of Oblique Side 20° | Length 50 μm | Line Width 2 μm |
| 33 | Rhomboid | No Variation in Opening Center | Angle of Oblique Side 30° | Length 100 μm | Line Width 2 μm |
| 34 | Rhomboid | No Variation in Opening Center | Angle of Oblique Side 30° | Length 150 μm | Line Width 2 μm |
| 35 | Rhomboid | No Variation in Opening Center | Angle of Oblique Side 30° | Length 200 μm | Line Width 2 μm |
| 36 | Rhomboid | No Variation in Opening Center | Angle of Oblique Side 30° | Length 50 μm | Line Width 2 μm |
| 37 | Rhomboid | No Variation in Opening Center | Angle of Oblique Side 40° | Length 100 μm | Line Width 2 μm |
| 38 | Rhomboid | No Variation in Opening Center | Angle of Oblique Side 40° | Length 150 μm | Line Width 2 μm |
| 39 | Rhomboid | No Variation in Opening Center | Angle of Oblique Side 40° | Length 200 μm | Line Width 2 μm |
| 40 | Rhomboid | No Variation in Opening Center | Angle of Oblique Side 40° | Length 50 μm | Line Width 2 μm |
| 41 | Parallelogram | No Variation in Opening Center | Angle of Oblique Side 30° | Length 100 μm | Line Width 2 μm |
| 42 | Parallelogram | No Variation in Opening Center | Angle of Oblique Side 30° | Length 200 μm | Line Width 2 μm |
| 43 | Square | No Variation in Opening Center | Length of One Side 100 μm | Line Width 2 μm | |
| 44 | Square | No Variation in Opening Center | Length of One Side 150 μm | Line Width 2 μm | |
| 45 | Square | No Variation in Opening Center | Length of One Side 200 μm | Line Width 2 μm | |
| 46 | Square | No Variation in Opening Center | Length of One Side 50 μm | Line Width 2 μm | |

TABLE 2

| BM No. | | dpi |
|---|---|---|
| BM1 | 1 | 98 |
| BM2 | 2 | 151 |
| BM3 | 3 | 151 |
| BM4 | 4 | 151 |
| BM5 | 5 | 151 |
| BM6 | 6 | 218 |
| BM7 | 7 | 218 |
| BM8 | 8 | 245 |
| BM9 | 9 | 265 |

TABLE 3

| | Mesh Pattern | Quantitative Value | BM1 | BM2 | BM3 | BM4 | BM5 | BM6 | BM7 | BM8 | BM9 |
|---|---|---|---|---|---|---|---|---|---|---|---|
| Comparative Example | 4 | −5.75 | 2.7 | 2.5 | 2.3 | 2.3 | 2.7 | 2.3 | 2.3 | 2.5 | 2.3 |
| | 8 | −5.70 | 2.0 | 2.0 | 2.0 | 2.0 | 2.0 | 2.0 | 2.0 | 2.0 | 2.0 |
| | 5 | −5.66 | 3.0 | 3.0 | 3.0 | 3.0 | 3.0 | 3.0 | 3.0 | 3.0 | 3.0 |
| | 5 | −5.66 | 2.3 | 2.5 | 2.0 | 2.3 | 2.0 | 2.3 | 2.3 | 2.0 | 2.5 |
| | 2 | −5.58 | 1.3 | 1.5 | 1.3 | 1.3 | 1.3 | 1.3 | 1 | 1.5 | 1.7 |
| | 9 | −5.55 | 1.0 | 1.0 | 1.0 | 3.3 | 1.0 | 1.0 | 1.0 | 1.0 | 1.0 |
| | 6 | −5.50 | 2.0 | 2.0 | 2.0 | 2.0 | 2.0 | 2.0 | 2.0 | 2.0 | 2.0 |
| | 7 | −6.02 | 3.0 | 2.0 | 3.3 | 3.3 | 3.3 | 3.0 | 3.0 | 2.0 | 3.5 |
| | 3 | −5.43 | 1.0 | 1.0 | 1.0 | 1.0 | 1.0 | 1.0 | 1.0 | 1.0 | 1.0 |
| Present Invention Example | 21 | −5.29 | 4.0 | 4.0 | 4.0 | 4.0 | 3.5 | 3.3 | 3.3 | 4.0 | 4.0 |
| | 23 | −5.26 | 4.0 | 4.0 | 4.0 | 4.0 | 3.5 | 4.0 | 3.7 | 4.0 | 4.0 |
| | 16 | −5.20 | 4.0 | 4.0 | 4.0 | 4.0 | 4.0 | 4.0 | 4.0 | 4.0 | 3.3 |
| | 21 | −5.20 | 4.0 | 3.7 | 3.5 | 4.0 | 3.3 | 4.0 | 3.3 | 3.3 | 3.3 |
| | 17 | −5.19 | 4.0 | 4.0 | 4.0 | 3.7 | 3.7 | 4.0 | 3.7 | 4.0 | 3.3 |
| | 10 | −5.18 | 4.0 | 4.0 | 4.0 | 4.0 | 4.0 | 4.0 | 4.0 | 4.0 | 3.3 |
| | 14 | −5.17 | 4.0 | 3.3 | 3.5 | 3.5 | 3.3 | 4.0 | 4.0 | 3.3 | 3.3 |
| | 25 | −5.16 | 4.0 | 4.0 | 3.5 | 3.7 | 4.0 | 4.0 | 4.0 | 4.0 | 3.5 |
| | 15 | −5.16 | 4.0 | 4.0 | 4.0 | 4.0 | 3.5 | 3.3 | 3.3 | 4.0 | 3.7 |
| | 18 | −5.15 | 4.0 | 4.0 | 3.5 | 4.0 | 4.0 | 3.7 | 4.0 | 4.5 | 4.0 |
| | 19 | −5.15 | 4.0 | 4.0 | 4.0 | 4.0 | 4.0 | 4.0 | 4.0 | 3.5 | 3.5 |
| | 12 | −5.11 | 4.0 | 3.3 | 3.0 | 3.7 | 3.7 | 4.0 | 4.0 | 4.0 | 4.0 |
| | 24 | −5.07 | 4.0 | 3.7 | 4.0 | 4.0 | 4.0 | 4.0 | 4.0 | 4.0 | 3.5 |
| | 13 | −5.05 | 4.0 | 4.0 | 4.0 | 4.0 | 3.3 | 4.0 | 4.0 | 3.3 | 3.3 |
| Comparative Example | 29 | −4.97 | 3.0 | 4.0 | 4.0 | 4.0 | 3.0 | 3.0 | 3.0 | 2.0 | 2.0 |
| | 28 | −4.92 | 2.3 | 2.0 | 2.3 | 2.0 | 3.0 | 3.0 | 2.0 | 3.7 | 2.0 |

TABLE 3-continued

| Mesh Pattern | Quantitative Value | BM1 | BM2 | BM3 | BM4 | BM5 | BM6 | BM7 | BM8 | BM9 |
|---|---|---|---|---|---|---|---|---|---|---|
| 27 | −4.90 | 3.0 | 2.0 | 3.3 | 2.0 | 2.0 | 3.0 | 2.0 | 3.7 | 3.5 |
| 26 | −4.88 | 3.3 | 3.0 | 3.5 | 3.3 | 3.0 | 3.0 | 3.0 | 3.3 | 3.0 |
| 11 | −4.61 | 1.0 | 1.0 | 1.0 | 1.0 | 1.0 | 1.0 | 2.0 | 1.3 | 1.3 |
| 10 | −4.47 | 1.0 | 1.0 | 1.0 | 1.0 | 1.0 | 1.3 | 2.0 | 1.3 | 1.3 |
| 39 | −4.43 | 2.0 | 3.3 | 3.0 | 3.0 | 2.0 | 3.0 | 2.3 | 3.0 | 1.0 |
| 45 | −4.38 | 1.0 | 1.0 | 1.0 | 1.0 | 1.0 | 1.0 | 1.0 | 1.0 | 1.0 |
| 38 | −4.37 | 4.0 | 2.0 | 3.0 | 1.0 | 2.0 | 2.0 | 1.0 | 2.0 | 1.0 |
| 35 | −4.35 | 3.3 | 2.0 | 2.0 | 2.3 | 2.3 | 2.0 | 2.0 | 3.0 | 1.5 |
| 41 | −4.35 | 4.0 | 1.0 | 1.0 | 1.0 | 1.0 | 1.0 | 2.0 | 1.0 | 1.0 |
| 44 | −4.32 | 1.0 | 1.0 | 1.0 | 1.0 | 1.0 | 1.0 | 1.0 | 1.0 | 1.0 |
| 34 | −4.28 | 1.7 | 4.0 | 2.0 | 3.0 | 2.3 | 2.0 | 2.0 | 2.0 | 1.5 |
| 37 | −4.27 | 1.0 | 2.0 | 2.3 | 2.0 | 2.3 | 1.0 | 2.0 | 3.0 | 1.0 |
| 31 | −4.23 | 2.0 | 1.3 | 2.0 | 2.0 | 1.0 | 1.0 | 2.0 | 2.0 | 1.0 |
| 43 | −4.23 | 1.0 | 2.0 | 1.0 | 1.0 | 1.0 | 1.0 | 1.0 | 1.0 | 1.0 |
| 33 | −4.19 | 3.3 | 2.0 | 3.0 | 2.0 | 1.0 | 2.0 | 2.5 | 2.0 | 1.0 |
| 41 | −4.18 | 4.0 | 1.0 | 1.0 | 1.3 | 1.0 | 2.0 | 2.3 | 1.0 | 1.0 |
| 30 | −4.17 | 2.0 | 2.0 | 2.0 | 1.0 | 2.0 | 1.0 | 2.0 | 2.0 | 1.0 |
| 40 | −4.09 | 2.0 | 4.0 | 3.0 | 1.0 | 1.0 | 1.0 | 1.0 | 3.0 | 2.0 |
| 46 | −4.07 | 1.0 | 2.0 | 1.0 | 1.0 | 1.0 | 1.0 | 1.0 | 1.0 | 1.0 |
| 36 | −4.01 | 3.0 | 1.0 | 2.0 | 1.0 | 2.0 | 1.0 | 2.0 | 1.0 | 1.0 |
| 32 | −3.86 | 3.0 | 2.0 | 2.0 | 2.0 | 1.0 | 1.0 | 2.0 | 2.0 | 1.0 |

As can be clearly seen from Table 3, the random mesh patterns 12 to 25, of which the pattern quantitative values are in a range of −5.29 to −5.05, are the present invention examples which have high deterioration levels even in all the cases of the BM1 to BM9 and are excellent in terms of visibility of moiré regardless of the BM types (the resolution and the pixel structure) of the BM1 to BM9.

Further, as can be clearly seen from Table 3, the random mesh patterns 1 to 11 and 26 to 46, of which the pattern quantitative values are out of a range of −5.29 to −5.11, are comparative examples which have deterioration level equal to or less than 3.0 for any of the BM1 to BM9 and are inferior in terms of visibility of moiré in at least one of the BM types (the resolution and the pixel structure) of the BM1 to BM9.

From the above description, effects of the present invention are clarified.

EXPLANATION OF REFERENCES 10, 11, 11A, 11B: conductive film
12: transparent substrate
14: thin line made of metal (thin metal line)
16, 16a, 16b: wiring portion
18, 18a, 18b: adhesive layer
20, 20a, 20b: protective layer
21: mesh wire
22: opening portion
17a and 17b: electrode portion
24: combined wiring pattern
24a: first (upper) wiring pattern
24b: second (lower) wiring pattern
25, 25a: random mesh pattern
26: dummy electrode portion
28, 28a, 28b: wiring layer
30: display unit
32, 32r, 32g, 32b: pixel
34: black matrix (BM)
38: BM pattern
40: display device
44: touch panel

What is claimed is:

1. A method of evaluating a conductive film that is provided on a display unit of a display device and has a wiring pattern which is formed in a mesh shape by a plurality of thin metal lines and in which a plurality of opening portions is arranged, the method comprising:
acquiring transmittance image data of the wiring pattern of an entire image of the conductive film;
calculating normalized spectrum intensities of spectrum peaks of the entire image which is obtained by performing two-dimensional Fourier transform on transmittance image data of the entire image;
extracting spectra which have the normalized spectrum intensities equal to or greater than a specified value;
calculating an angle, which is formed between one coordinate axis of two-dimensional Fourier coordinates and a straight line connecting coordinates of each extracted spectrum and an origin of the two-dimensional Fourier coordinates, in units of a specific angle for each extracted spectrum;
calculating intensity differences, each of which is obtained from a maximum value and a minimum value of the normalized spectrum intensity for each angle, at all points of the extracted spectrum by oscillating the angle by each unit of the specific angle, with respect to the extracted spectrum, and calculating a second sample standard deviation indicating a variation of first sample standard deviations, each of which indicates a variation of the normalized spectrum intensities at a single angle, in all angular directions, as a quantitative value of the wiring pattern; and
evaluating the wiring pattern where one or more clusters of bars, which indicate frequencies of a histogram at an average value or more of the intensity difference in a case where the histogram is a histogram of the calculated intensity differences at all the points, are isolated from the other cluster and the quantitative value is in a specific numerical value range.

2. The method of evaluating the conductive film according to claim 1,
wherein each normalized spectrum intensity is a standard value which is normalized by an image size and an average value of a spectrum intensity of each spectrum of the entire image, wherein the specified value is −4.0 as a value which is 10,000 times a logarithmic value of a value of the normalized spectrum intensity, wherein the unit of the specific angle is 1 degree, wherein each intensity difference is 10,000 times a logarithmic value of a value of a difference between a maximum value and a minimum value of the normalized spectrum intensity at one angle, wherein a range of the intensity difference forming a horizontal axis of the histogram is from −4.0 to 0, and a step width of the range is 0.1, and wherein the specific numerical value range is from −5.29 to −5.05.

3. The method of evaluating the conductive film according to claim 2, wherein the angle is obtained by calculating a value of the angle up to two decimal places and rounding off the value with two decimal places to one decimal place.

4. The method of evaluating the conductive film according to claim 1, wherein the wiring pattern is formed by generating a plurality of dots regularly arranged on a rectangular plane, moving the arranged dots in arbitrary directions of 360 degrees using random numbers so as to give randomicity, generating polygons centering on the randomly arranged dots, and thinning a region between the polygons.

5. The method of evaluating the conductive film according to claim 1, wherein the wiring pattern is superposed on a pixel array pattern of the display unit.

* * * * *